(12) United States Patent
Ostanevich et al.

(10) Patent No.: US 10,241,789 B2
(45) Date of Patent: Mar. 26, 2019

(54) METHOD TO DO CONTROL SPECULATION ON LOADS IN A HIGH PERFORMANCE STRAND-BASED LOOP ACCELERATOR

(71) Applicant: Intel Corporation, Santa Clara, CA (US)

(72) Inventors: Alexander Y. Ostanevich, Moscow (RU); Sergey P. Scherbinin, Obninsk (RU); Jayesh Iyer, Santa Clara, CA (US); Dmitry M. Maslennikov, Moscow (RU); Denis G. Motin, Moscow (RU); Alexander V. Ermolovich, Moscow (RU); Andrey Chudnovets, Moscow (RU); Sergey A. Rozhkov, San Jose, CA (US); Boris A. Babayan, Moscow (RU)

(73) Assignee: INTEL CORPORATION, Santa Clara, CA (US)

( * ) Notice: Subject to any disclaimer, the term of this patent is extended or adjusted under 35 U.S.C. 154(b) by 84 days.

(21) Appl. No.: 15/391,789

(22) Filed: Dec. 27, 2016

(65) Prior Publication Data
US 2018/0181396 A1    Jun. 28, 2018

(51) Int. Cl.
*G06F 9/312*    (2018.01)
*G06F 9/40*    (2006.01)
(Continued)

(52) U.S. Cl.
CPC ........... *G06F 9/30087* (2013.01); *G06F 9/30* (2013.01); *G06F 9/3017* (2013.01); *G06F 9/38* (2013.01);
(Continued)

(58) Field of Classification Search
CPC ............... G06F 9/30043; G06F 9/3001; G06F 9/30021; G06F 9/30058; G06F 9/30065;
(Continued)

(56) References Cited

U.S. PATENT DOCUMENTS 6,189,088 B1 *  2/2001  Gschwind ............... G06F 8/445
                                                712/216
6,381,691 B1 *  4/2002  Altman ................. G06F 9/3804
                                                712/216
(Continued)

FOREIGN PATENT DOCUMENTS

WO    2015097494 A1    7/2015

OTHER PUBLICATIONS

Raman, et al., "Parallel-Stage Decoupled Software Pipelining," ACM, CGO'08, Apr. 5-10, 2008, 10 pages.

*Primary Examiner* — Daniel H Pan
(74) *Attorney, Agent, or Firm* — NDWE, LLP

(57) ABSTRACT

An apparatus includes a binary translator to hoist a load instruction in a branch of a conditional statement above the conditional statement and insert a speculation control of load (SCL) instruction in a complementary branch of the conditional statement, where the SCL instruction provides an indication of a real program order (RPO) of the load instruction before the load instruction was hoisted. The apparatus further includes an execution circuit to execute the load instruction to perform a load and cause an entry for the load instruction to be inserted in an ordering buffer, and where the execution circuit is to execute the SCL instruction to locate the entry for the load instruction in the ordering buffer using the RPO of the load instruction provided by the SCL instruction and discard the entry for the load instruction from the ordering buffer.

20 Claims, 19 Drawing Sheets

(51) Int. Cl.
*G06F 9/30* (2018.01)
*G06F 9/38* (2018.01)

(52) U.S. Cl.
CPC .......... *G06F 9/3842* (2013.01); *G06F 9/3855* (2013.01); *G06F 9/3859* (2013.01); *G06F 9/3016* (2013.01); *G06F 9/30043* (2013.01); *G06F 9/30058* (2013.01); *G06F 9/3844* (2013.01)

(58) Field of Classification Search
CPC .... G06F 9/3016; G06F 9/3832; G06F 9/3836; G06F 9/3842; G06F 9/3844; G06F 9/3846; G06F 9/3855; G06F 9/3859; G06F 9/381; G06F 9/325; G06F 9/30087; G06F 9/30; G06F 9/3017; G06F 9/38
USPC ................ 712/205–219, 227, 233–241, 245
See application file for complete search history.

(56) References Cited

U.S. PATENT DOCUMENTS

| | | | |
|---|---|---|---|
| 6,728,873 B1* | 4/2004 | Guthrie | G06F 9/30087 711/145 |
| 2002/0091913 A1* | 7/2002 | Fukagawa | G06F 9/3836 712/218 |
| 2010/0274972 A1 | 10/2010 | Babayan et al. | |
| 2013/0339711 A1 | 12/2013 | Kosarev et al. | |
| 2015/0301831 A1 | 10/2015 | Iyer et al. | |

* cited by examiner

```
If ( p > 0 )
{
    x = x + 1;
}
else
{
    y = 0;
} z = x;
```

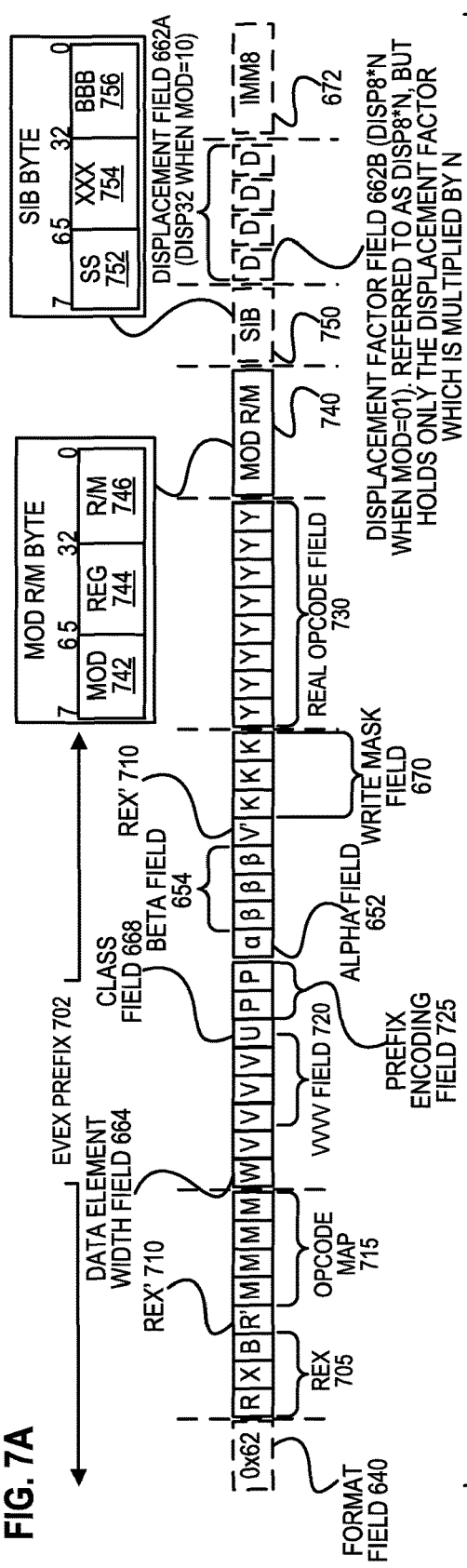
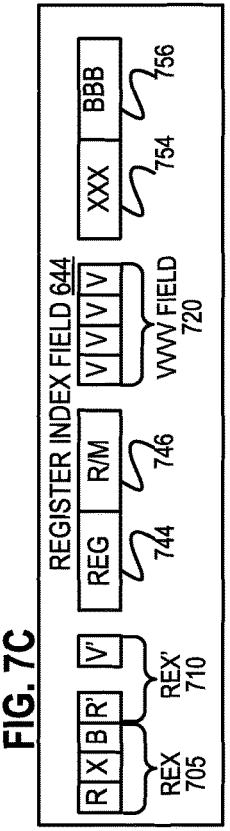
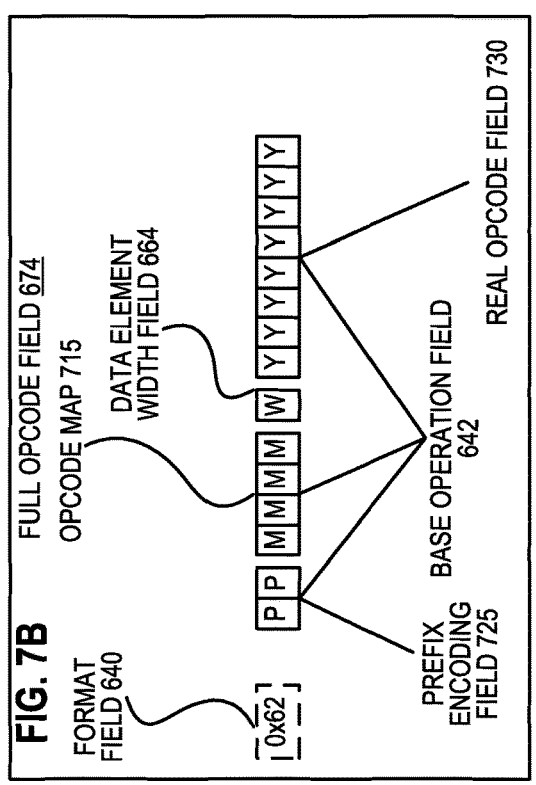
FIG. 7A
FIG. 7B
FIG. 7C

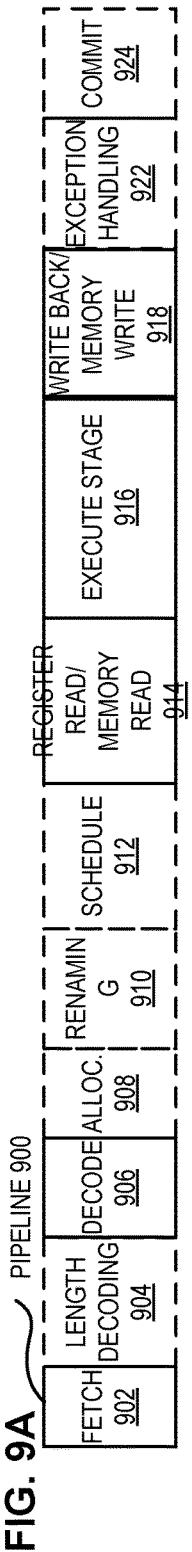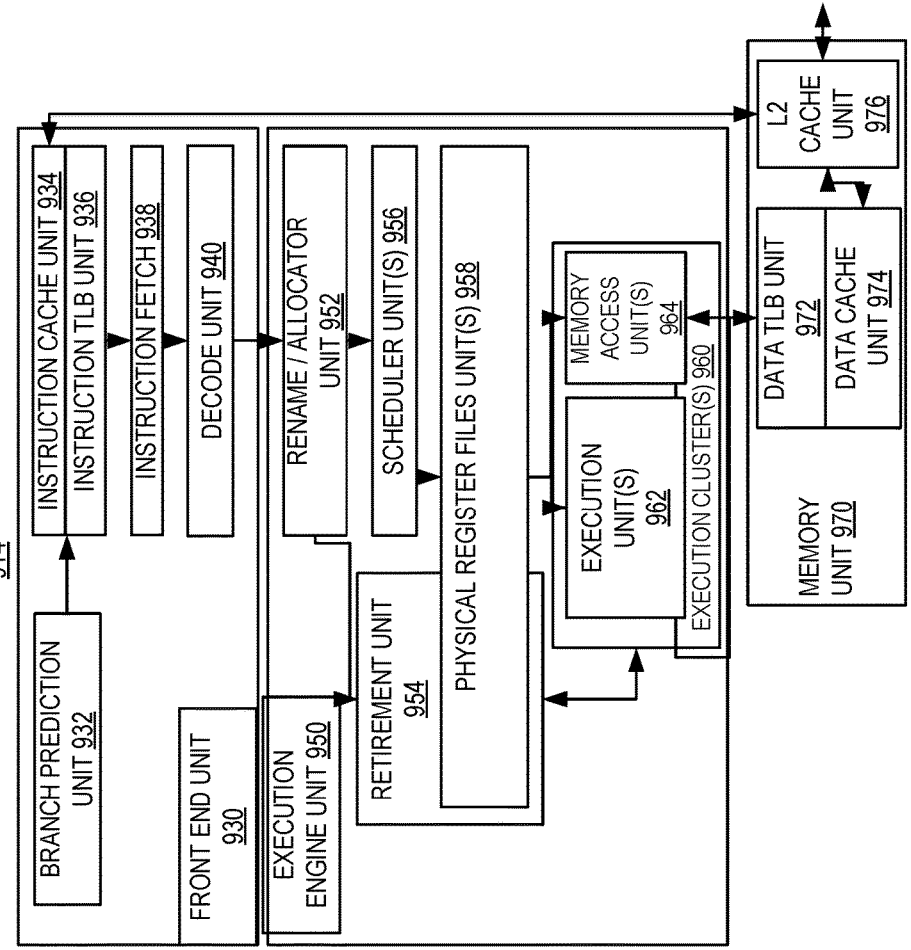
FIG. 9A
FIG. 9B

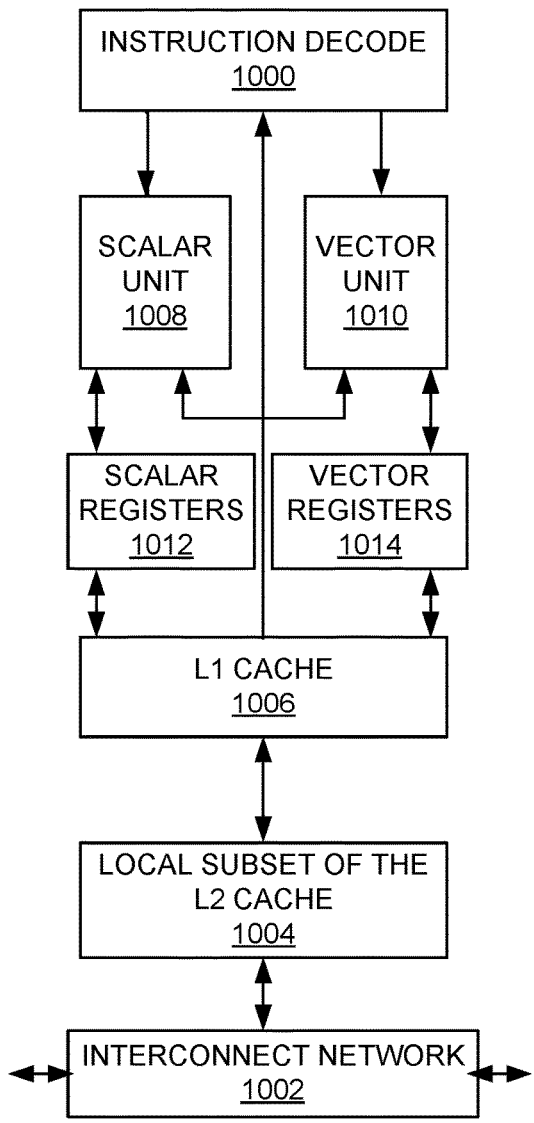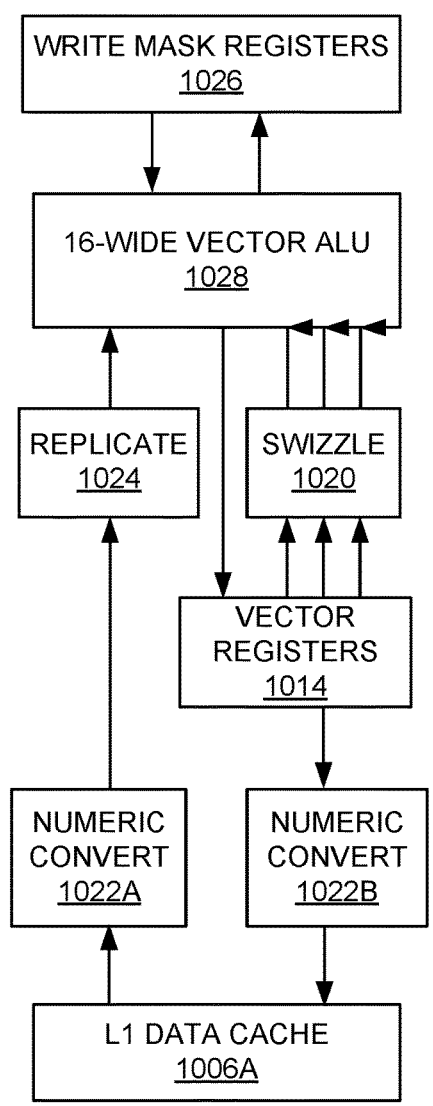

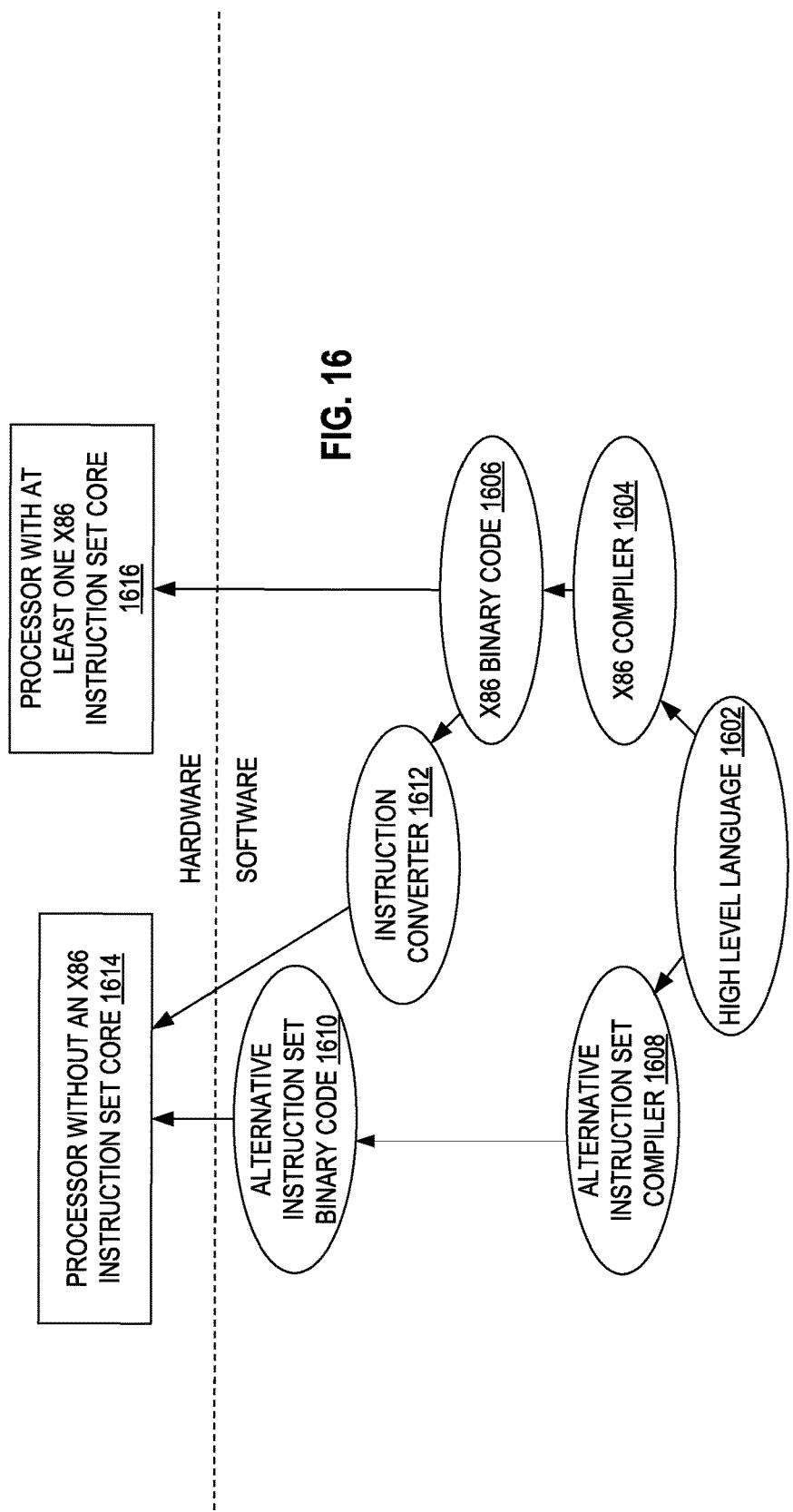

US 10,241,789 B2

METHOD TO DO CONTROL SPECULATION ON LOADS IN A HIGH PERFORMANCE STRAND-BASED LOOP ACCELERATOR

TECHNICAL FIELD

Embodiments of the invention relate to the field of computing; and more specifically, performing control speculation for loads in a strand-based loop accelerator.

BACKGROUND

Speculative execution is an optimization technique where a computer system performs some task in advance before it is known whether it will be needed in order to prevent any delay that would be incurred by performing the task after it is already known that it is needed. Modern pipelined microprocessors employ speculative execution to reduce the cost of conditional branch instructions using schemes that predict the execution path of a program based on the historical behavior of branch executions. For example, a load instruction can be hoisted above some preceding instructions, including a conditional statement (e.g., if-statement or if-then-else statement), to hide memory access latency. By hoisting the load instruction above the conditional statement, the load corresponding to the load instruction is performed before it is known whether the load will be needed. Such technique of hoisting a load instruction above a conditional statement is referred to as control speculation.

In order to ensure proper program execution when control speculation is employed, the following issues need to be addressed in order to ensure correct program execution: (1) remembering the original place of the load instruction before hoisting; (2) upon performing the speculative load, keeping all the results, including potential exceptions, for some time; (3) disclosing the results of the speculative load to architectural state when control flow passes the original place of the load; and (4) discarding the results of the speculative load if control flow does not pass the original place of the load.

BRIEF DESCRIPTION OF THE DRAWINGS

The invention may best be understood by referring to the following description and accompanying drawings that are used to illustrate embodiments of the invention. In the drawings:

FIG. 6A is a block diagram illustrating a generic vector friendly instruction format and class A instruction templates thereof according to embodiments of the invention;

FIG. 6B is a block diagram illustrating the generic vector friendly instruction format and class B instruction templates thereof according to embodiments of the invention;

FIG. 7A is a block diagram illustrating an exemplary specific vector friendly instruction format according to embodiments of the invention;

FIG. 7B is a block diagram illustrating the fields of the specific vector friendly instruction format 700 that make up the full opcode field 674 according to one embodiment of the invention;

FIG. 7C is a block diagram illustrating the fields of the specific vector friendly instruction format 700 that make up the register index field 644 according to one embodiment of the invention;

FIG. 9A is a block diagram illustrating both an exemplary in-order pipeline and an exemplary register renaming, out-of-order issue/execution pipeline according to embodiments of the invention;

FIG. 9B is a block diagram illustrating both an exemplary embodiment of an in-order architecture core and an exemplary register renaming, out-of-order issue/execution architecture core to be included in a processor according to embodiments of the invention;

FIGS. 10A-B illustrate a block diagram of a more specific exemplary in-order core architecture, which core would be one of several logic blocks (including other cores of the same type and/or different types) in a chip;

FIG. 10A is a block diagram of a single processor core, along with its connection to the on-die interconnect network 1002 and with its local subset of the Level 2 (L2) cache 1004, according to embodiments of the invention;

FIG. 10B is an expanded view of part of the processor core in FIG. 10A according to embodiments of the invention;

FIG. 12 shown a block diagram of a system in accordance with one embodiment of the present invention;

FIG. 13 is a block diagram of a first more specific exemplary system in accordance with an embodiment of the present invention;

FIG. 14 is a block diagram of a second more specific exemplary system in accordance with an embodiment of the present invention;

FIG. 15 is a block diagram of a SoC in accordance with an embodiment of the present invention; and FIG. 16 is a block diagram contrasting the use of a software instruction converter to convert binary instructions in a source instruction set to binary instructions in a target instruction set according to embodiments of the invention.

DETAILED DESCRIPTION

Figure 1:
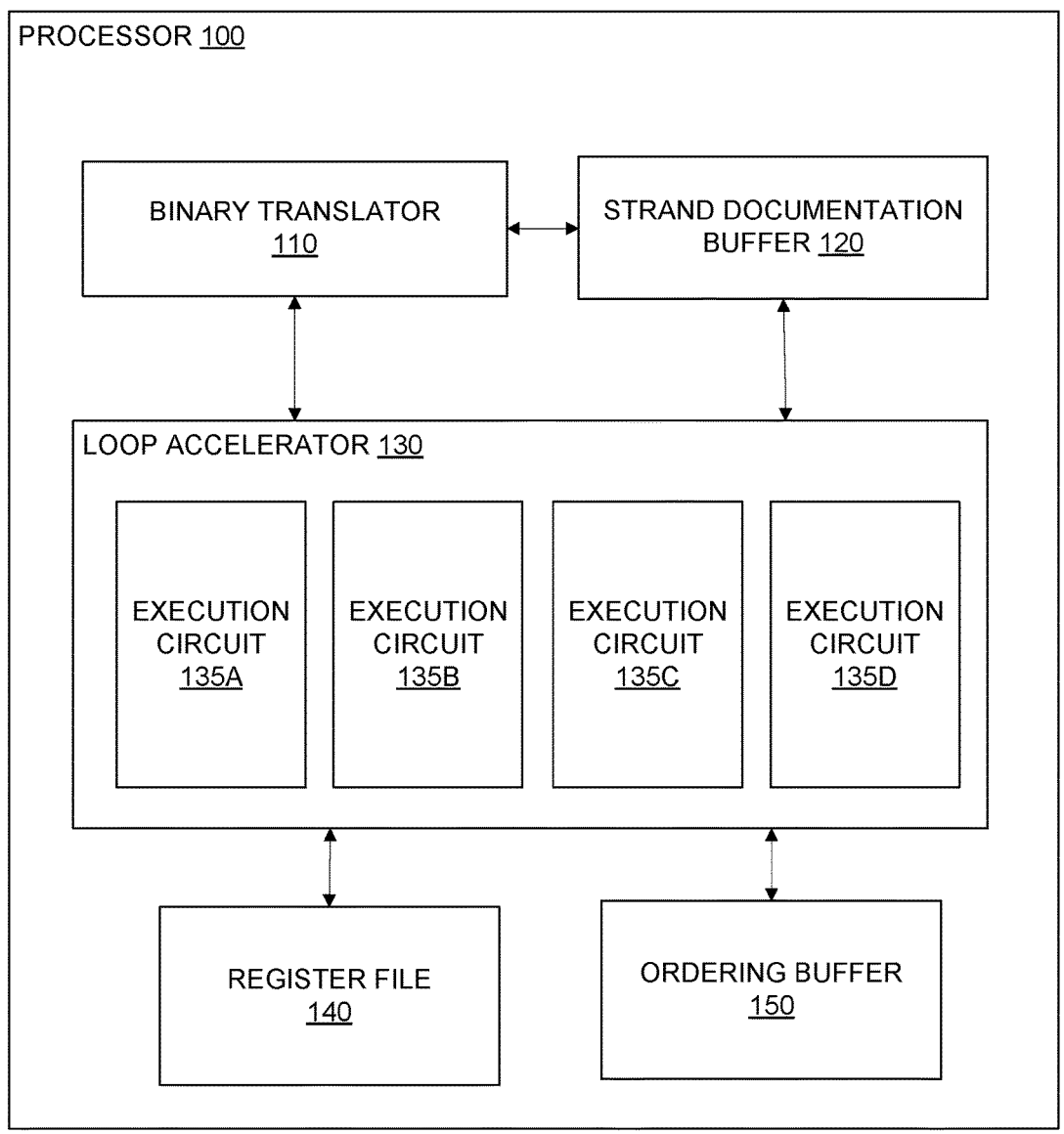
FIG. 1 is a diagram illustrating a processor that implements control speculation to enable high levels of inter-iteration parallelism in a highly parallel strand-based architecture, according to some embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

In order to ensure proper program execution when control speculation is employed, the following issues need to be addressed: (1) remembering the original place of the load instruction before hoisting; (2) upon performing the speculative load, keeping all the results, including potential exceptions, for some time; (3) disclosing the results of the speculative load to architectural state when control flow passes the original place of the load; and (4) discarding the results of the speculative load if control flow does not pass the original place of the load.

Control speculation can be implemented in several different ways. In conventional general purpose processors with single instruction flow, a load instruction is split into two instructions: speculative load (ld.s) and speculation check (chk.s). The ld.s instruction is hoisted and performs a load in advance. As a result, the ld.s instruction either loads the correct memory value or an exception token to an architectural register (but does not deliver an exception as a conventional load instruction would). The chk.s instruction verifies that speculation is confirmed and if the speculation is confirmed, delivers either an exception or the correct result to load consumers.

Embodiments disclosed herein provide a binary translator assisted control speculation scheme that enables high levels of inter-iteration parallelism in a multi-strand loop processor. According to some embodiments, the binary translator hoists a load instruction in a branch of a conditional statement above the conditional statement and inserts a special instruction, called a speculation control of load (SCL) instruction, in a complimentary branch of the conditional statement. The result of the load (corresponding to the hoisted load instruction) is preserved in an ordering buffer until retirement, which is to be performed in-order. In the case that speculation is confirmed (control flow entered the branch of the conditional statement that included the original load instruction), no other action need be taken. In the case that the speculation is incorrect (control flow entered a complimentary branch of the conditional statement), the SCL instruction inserted in the complimentary branch is executed to discard the result of the load from the ordering buffer, which effectively cancels the result of the hoisted load as if no load was performed.

An advantage of embodiments disclosed herein is that they do not introduce extra instructions into the control flow path when speculation is confirmed (this is in contrast to techniques that insert a chk.s instruction or similar instruction, which potentially penalizes the critical path). Another advantage of embodiments disclosed herein is that the SCL instruction guarantees that the results of a hoisted load are canceled if misspeculation occurs, which allows safe execution of parallel iterations. Other advantages will be apparent to one having ordinary skill in the art from the disclosure provided herein.

As used herein, a strand or micro-thread is a sequence of instructions arranged by a binary translator (e.g., at program compilation time for the hot loops identified), where instructions belonging to the same strand or micro-thread are to be executed by hardware in-order.

As used herein, a multi-strand out-of-order loop processor (sometimes referred to herein simply as a multi-strand loop processor or loop accelerator) is an accelerator that processes multiple strands or micro-threads created by a binary translator in parallel such that: (1) instructions of a strand or micro-thread may be fetched, issued, and executed out of program order with respect to instructions of different strands or micro-threads and (2) all but memory and interruptible instructions may be committed (retired) out of program order.

FIG. 1 is a diagram illustrating a processor that implements control speculation to enable high levels of inter-iteration parallelism in a highly parallel strand-based architecture, according to some embodiments. As shown in the diagram, the processor 100 includes a binary translator 110, a strand documentation buffer 120, a loop accelerator 130, a register file 140, and an ordering buffer 150. The binary translator 110 translates program code (e.g., x86 binary) into code that can be run on the loop accelerator 130. The binary translator 110 may perform static analysis of the program code to identify any loops in the program code. Based on this static analysis, the binary translator 110 may decompose the loops in the program code into one or more strands. A strand (which may also be referred to as a micro-thread) is a sequence of instructions arranged by the binary translator 110, where instructions belonging to the same strand are to be executed by hardware (e.g., loop accelerator 130) in-order. As will be described in additional detail below, multiple strands can be executed in parallel by the loop accelerator 130 to accelerate loop execution, where instructions from different strands may be executed out-of-order. The binary translator 110 may create strands based on the characteristics of the loops in the program code. For example, the binary translator 110 may create strands such that dependent instructions (e.g., dependent on register or memory) are placed in the same strand as other instructions they depend upon, while independent instructions are placed in separate strand. This allows the strand with the independent instructions to make progress even if the strand with the dependent instructions is stalled (e.g., because it is waiting for a memory access operation to complete).

In one embodiment, the binary translator 110 is communicatively coupled to a strand documentation buffer 120 that stores strand documentation. In one embodiment, the strand documentation buffer 120 stores strand documentation for each strand (per strand) that is being executed by the loop accelerator 130. The strand documentation for a strand includes information regarding the properties of the strand. Although the strand documentation buffer 120 is describe above as being a single buffer that includes strand documentation for all strands, it should be understood that other embodiments may provide a separate strand documentation buffer 120 (hardware buffer) per strand that is to store strand documentation for the corresponding strand. In one embodiment, the strand documentation for a strand includes an indication of an instruction pointer for the strand. The instruction pointer for a strand indicates the current instruction being executed by the strand (or the next instruction to be executed by the strand, depending on implementation). The strand-based architecture thus employs multiple instruction pointers (one per strand), which is in contrast to a typical superscalar processor that only employs a single instruction pointer. In one embodiment, the strand documentation for a strand includes an indication of an iteration number for the strand. The iteration number for the strand indicates the current loop iteration that is being executed by the strand. In one embodiment, the strand documentation for a strand includes an indication of a loop exit counter for the strand. The loop exit counter for the strand allows detection of a counted exit. In one embodiment, the strand documentation for a strand includes an indication of a register base for the strand. The register base for the strand indicates the set of registers that the strand can work with for the current loop iteration being executed by the strand. The strand documentation for a strand may thus contain information that defines the current state of execution of the strand (e.g., which instruction is being executed, which iteration within the loop is being executed, and which registers the strand can work with). As such, different strands can execute the same program code (e.g., code within a loop body) in parallel, but for different loop iterations, depending on the contents of the strand documentation.

The binary translator 110 is communicatively coupled to the loop accelerator 130 and may provide strands to the loop accelerator 130 for execution. The loop accelerator 130 is a hardware component that is dedicated for accelerating loop execution. The loop accelerator 130 includes multiple execution circuits 135 (execution circuits 135A-D) to process multiple strands in parallel. As shown in the diagram, the loop accelerator 130 includes four execution circuits 135. As such, this loop accelerator 130 is able to process four strands in parallel. However, it should be understood that the loop accelerator 130 can include more or less execution circuits 135 than shown in the diagram. The loop accelerator 130 executes instructions belonging to the same strand sequentially (in-order). However, the loop accelerator 130 may execute instructions belonging to different strands non-sequentially (out-of-order) as long as there are no dependencies between them that prevent such parallelization. The loop accelerator 130 is communicatively coupled to the strand documentation buffer 120. The loop accelerator 130 may access and update strand documentation stored in the strand documentation buffer 120 when processing a strand (e.g., to update the current state of execution of the strand). The loop accelerator 130 is also communicatively coupled to a register file 140 that includes multiple registers. The loop accelerator 130 (and more specifically, the execution circuits 135 of the loop accelerator 130) may work with the registers of the register file 140 when executing instructions. The loop accelerator 130 is also communicatively coupled to an ordering buffer 150. As will be described in further detail herein below, the ordering buffer 150 stores entries for load instructions to preserve the results of the load instructions until the load instructions are ready to be retired.

As mentioned above, the loop accelerator 130 may execute instructions from different strands out-of-order. Although instructions may be executed out-of-order, the side effects (e.g., memory state changes, interrupts, and faults) should appear in-order, as encoded in the original instruction flow. In one embodiment, the binary translator 110 assigns a sequence number, referred to herein as a real program order (RPO), to instructions or a subset of the instructions (e.g., just the orderable instructions (e.g., memory access instructions and interruptible instructions)). The RPO may be a natural number that is assigned to instructions (e.g., orderable instructions) in progressive order, but need not be consecutive. In one embodiment, RPO values increase as instructions become younger. Stated differently, elder instructions are assigned a smaller RPO relative to younger instructions. The assignment of RPOs preserves information about the original program order, which allows the loop accelerator 130 to properly retire orderable instructions in original program order (to ensure that side effects appear in-order). In one embodiment, the RPO of an instruction is encoded in the instruction itself (e.g., by the binary translator 110).

Each instruction is processed by the loop accelerator 130 through several pipeline stages. For sake of illustration and simplicity, the stages can be narrowed down to decode stage, read stage, execute stage, write-back stage, and retire stage. Instructions can be divided into two categories: orderable instructions (e.g., memory access instructions and interruptible instructions) and non-orderable instructions (e.g., integer arithmetic instructions, logical instructions, and branch instructions). A load instruction is an example of an orderable instruction. In one embodiment, when a load instruction is executed speculatively and out-of-order, an entry for the load instruction is inserted into the ordering buffer 150. In one embodiment, the entry for the load instruction includes the RPO of the load instruction and a result of the load (which may be an actual value or an exception). This entry serves to preserve the result of the load until in-order retirement comes, which addresses the second issue mentioned above with regard to control speculation (upon performing the speculative load, keeping all the results, including potential exceptions, for some time). As far as all of the load instructions have an RPO (assigned by binary translator 110) that can be reconstructed from corresponding strand execution, this RPO can be used to identify both the original place of the load instruction and the place of the hoisted load instruction in overall real program order. This addresses the first and third issues mentioned above with regard to control speculation (remembering the original place of the load instruction before hoisting and disclosing the results of the speculative load to architectural state when control flow passes the original place of the load). In one embodiment, the remaining issue (the fourth issue—discarding the results of the speculative load if control flow does not pass the place of the original load) is addressed by introducing a new instruction referred to herein as a speculation control for load (SCL) instruction. The SCL instruction provides an indication of the RPO of the original load instruction before it was hoisted (e.g., as an operand of the SCL instruction). If control flow reaches the SCL instruction, this means that there was a misspeculation, and thus the original load instruction need not have been executed. The SCL instruction is executed to discard the entry for the load instruction from the ordering buffer 150 in order to cancel the results of the load performed by the load instruction.

In one embodiment, the SCL instruction has the following format:
<opcode>=SCL, <op1_const>=RPO_control_delta, <op2_const>=mode
The opcode for the SCL instruction is SCL. The first operand is RPO_control_delta, which represents the distance between the SCL instruction and the original load instruction (e.g., difference in terms of RPO). The second operand is mode, which indicates whether the destination register of the load instruction should be set to EMPTY state or FULL state (e.g., a register may contain a bit to indicate EMPTY state or FULL state, which is used to provide synchronization between strands).

In one embodiment, the loop accelerator 130 executes the SCL instruction as follows. At decode stage, the loop accelerator 130 (or more specifically, an execution circuit 135 of the loop accelerator 130) determines the RPO of the SCL instruction itself (RPO.cur). At execution stage, the loop accelerator 130 determines the target RPO (RPO.targ) of the speculative load under control, where RPO.targ=RPO.cur+RPO_control_delta. The loop accelerator 130 then scans the ordering buffer 150 for an entry that matches RPO.targ. If such an entry is located, the loop accelerator 130 discards the entry from the ordering buffer 150. The loop accelerator 130 then sets the mode of the destination register of the load instruction to EMPTY state or FULL state depending on the mode provided by the SCL instruction.

In one embodiment, control speculation is performed as follows. The binary translator 110 hoists a load instruction in a branch of a conditional statement above the conditional statement (to cause the load instruction to be executed speculatively) and inserts an SCL instruction in one or more complimentary branches of the conditional statement. A complimentary branch of the conditional statement is a branch of the conditional statement that is different from the branch that includes the load instruction to be hoisted. In one embodiment, the SCL instruction provides an indication of the RPO of the original load instruction (before the load instruction was hoisted). The loop accelerator 130 executes the (hoisted) load instruction to perform a load and cause an entry for the load instruction to be inserted in the ordering buffer 150. In one embodiment, the entry for the load instruction includes the RPO of the load instruction and a result of the load. The entry for the load instruction is preserved in the ordering buffer 150 until retirement, which is to be performed in RPO order. In the case that speculation is confirmed (control flow entered the branch of the conditional statement that included the original load instruction), no other action need be taken. In the case that the speculation is incorrect (control flow entered a complimentary branch of the conditional statement), the loop accelerator 130 executes the SCL instruction inserted in the complimentary branch to discard the entry for the load instruction from the ordering buffer 150 (based on scanning the ordering buffer 150 to locate an entry having an RPO that matches the RPO provided by the SCL instruction), which effectively cancels the result of the load instruction as if no load was performed (since it is no longer in the ordering buffer 150 and thus will not be retired).

Figure 2:
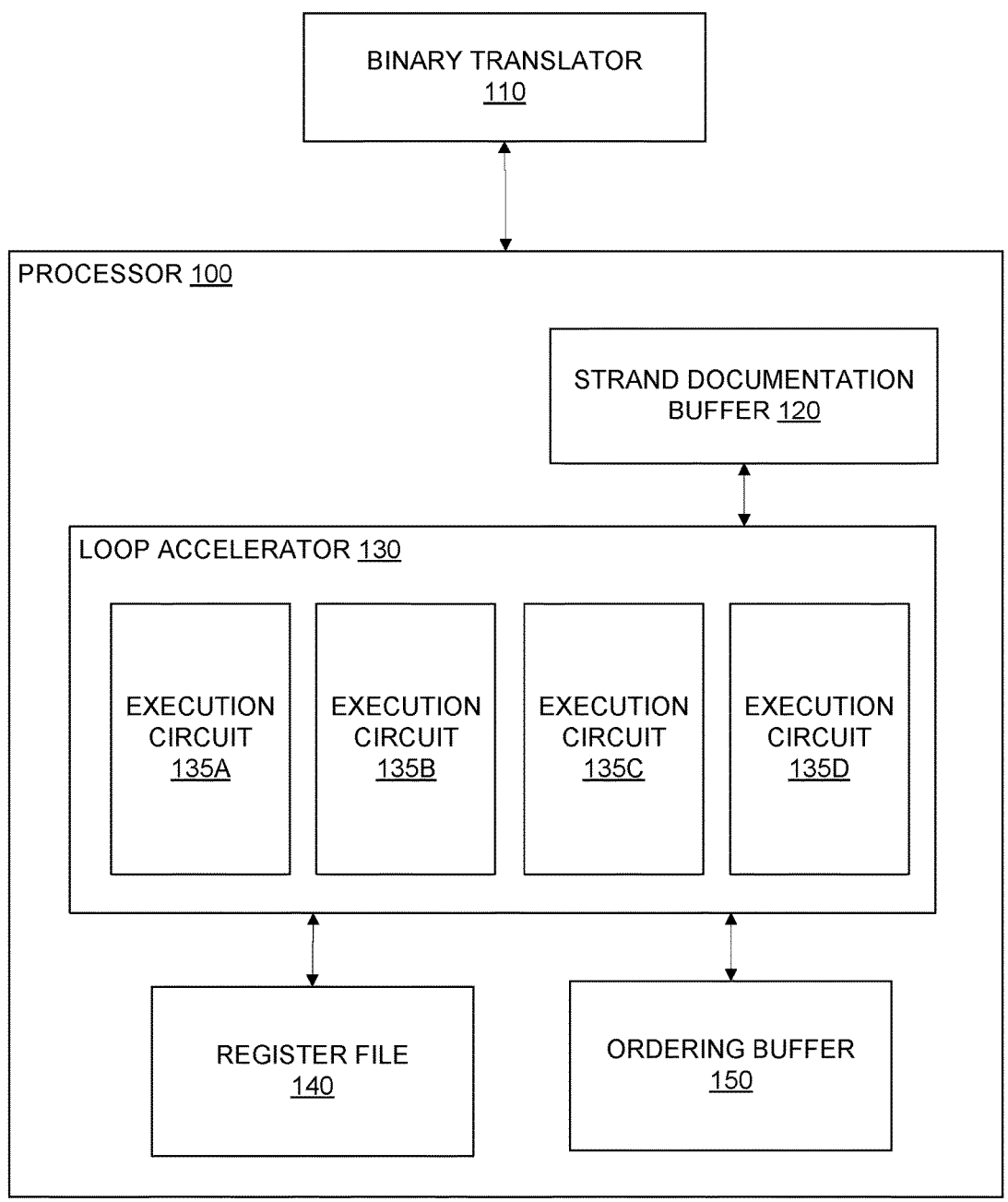
FIG. 2 is a diagram illustrating a system that implements control speculation to enable high levels of inter-iteration parallelism in a highly parallel strand-based architecture, according to some embodiments.

FIG. 2 is a diagram illustrating a system that implements control speculation to enable high levels of inter-iteration parallelism in a highly parallel strand-based architecture, according to some embodiments. The system has similar components as the processor 100 shown in FIG. 1, except that the binary translator 110 is implemented external to the processor 100 (e.g., as a software implementation). It should be understood that the arrangement of components shown in the diagrams is provided by way of example and not limitation. Different embodiments may employ a different arrangement of components than shown in the diagrams.

Figure 3:
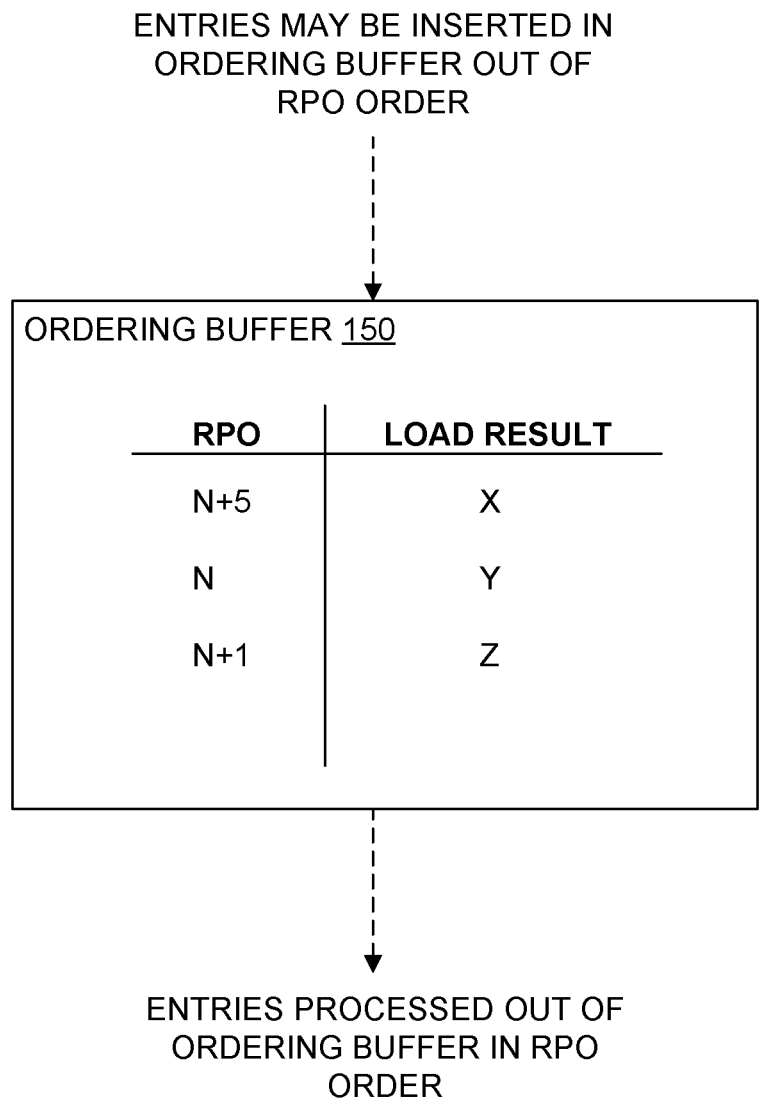
FIG. 3 is a diagram illustrating an ordering buffer, according to some embodiments.

FIG. 3 is a diagram illustrating an ordering buffer, according to some embodiments. As shown, the ordering buffer 150 includes three entries. The first entry is an entry for a load instruction having RPO N+5 and a load result of X. The second entry is an entry for a load instruction having RPO N and a load result of Y. The third entry is an entry for a load instruction having RPO N+1 and a load result of Z. The entries may have been inserted in the ordering buffer 150 based on execution of corresponding load instructions (e.g., either a speculative load instruction or conventional load instruction). The entries may have been inserted in the ordering buffer 150 out of RPO order. However, entries are processed out of the ordering buffer 150 for retirement in RPO order. This ensures that side effects appear in-order, as encoded in the original instruction flow.

As an example, it is assumed that the entry for the load instruction having RPO N (the second entry in the ordering buffer 150) was inserted in the ordering buffer 150 as a result of speculatively executing a load instruction. However, if misspeculation occurs, an SCL instruction that provides an indication of the RPO of the load instruction (RPO of N) will be executed (since the binary translator 110 places an SCL instruction in the complementary branch of the conditional statement), and this will cause the entry for the load instruction having RPO N to be discarded from the ordering buffer 150. As a result, the results of the load instruction having RPO N are effectively canceled as if the load instruction was never executed.

Figures 4A, 4B:
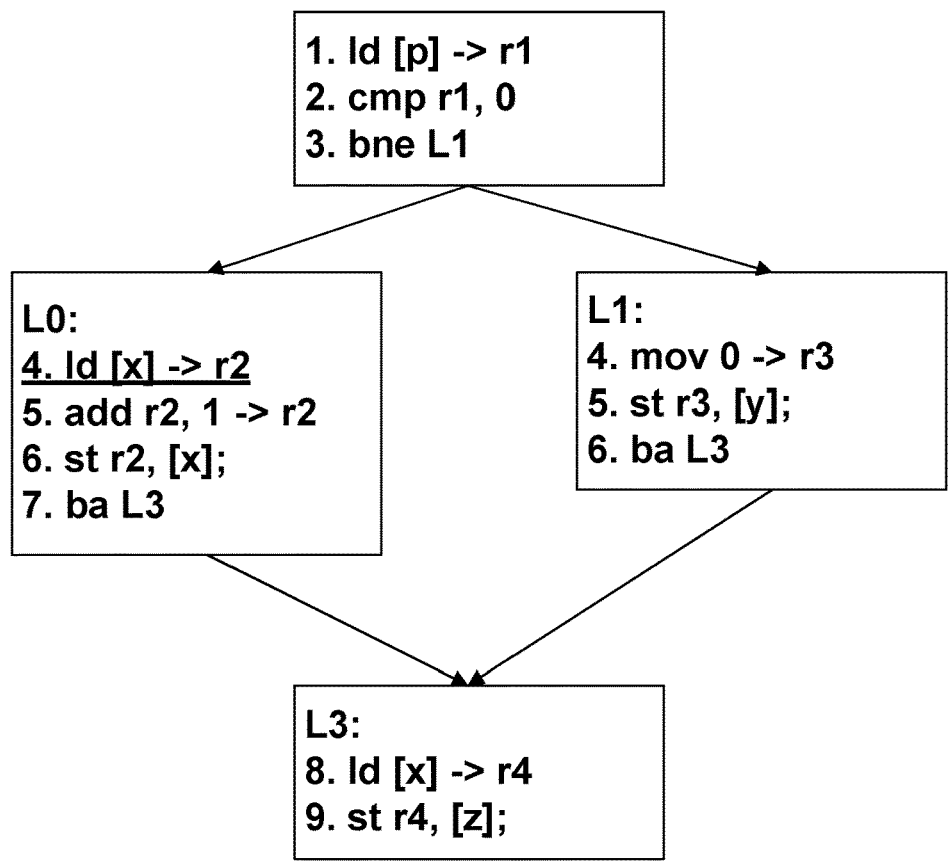
FIG. 4A is a diagram illustrating an exemplary source code for which control speculation can be applied, according to some embodiments.
FIG. 4B is a diagram illustrating exemplary assembly code for the source code shown in FIG. 4A before control speculation is applied, according to some embodiments.
Figure 4C:
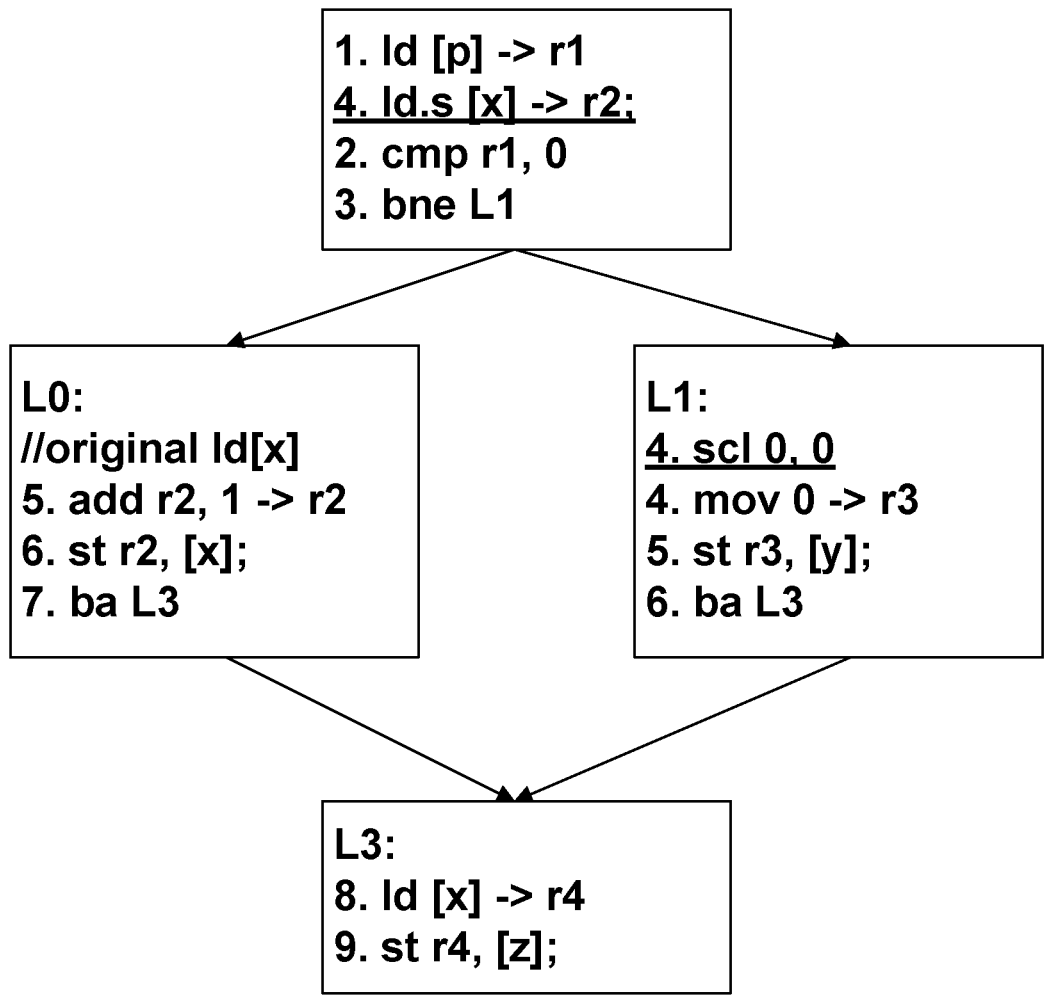
FIG. 4C is a diagram illustrating exemplary assembly code for the source code shown in FIG. 4A after control speculation is applied, according to some embodiments.

FIG. 4A is a diagram illustrating an exemplary source code for which control speculation can be applied, according to some embodiments. The source code specifies a conditional statement ("If (p>0)"). If the conditional statement is satisfied, then control flow moves to the first branch of the conditional statement, which includes the instruction "x=x+1." Otherwise, if the conditional statement is not satisfied, then control flow moves to the second branch of the conditional statement, which includes the instruction "y=0." The source code further includes the instruction "z=x" after the branches of the conditional statement. FIG. 4B and FIG. 4C illustrate the assembly code for the source code before control speculation is applied and after control speculation is applied, respectively.

FIG. 4B is a diagram illustrating exemplary assembly code for the source code shown in FIG. 4A before control speculation is applied, according to some embodiments. As shown in the diagram, the first branch (labeled as branch L0) includes a load instruction ("ld[x]->r2"). The binary translator 110 may determine that the control flow is likely to reach this load instruction (e.g., that control flow will enter branch L0) and thus the binary translator 110 hoists this load instruction above the conditional statement (e.g., above the "cmp r1, 0" instruction and "bne L1" instruction). Branch L1 is the complimentary branch in this case since it is a branch of the conditional statement that is different from the branch that includes the original load instruction. It should be noted that the load instruction is assigned an RPO of 4 in this example.

FIG. 4C is a diagram illustrating exemplary assembly code for the source code shown in FIG. 4A after control speculation is applied, according to some embodiments. As shown in the diagram, the load instruction ("ld[x]->r2") has been hoisted from branch L0 to be placed above the conditional statement. Also, the binary translator 110 inserted an SCL instruction in the complimentary branch of the conditional statement (branch L1). The first operand of the SCL instruction indicates the distance between the original load instruction and the SCL instruction. In this example, the RPO of the original load instruction is 4 and the RPO of the SCL instruction is also 4. As such, the distance between the original load instruction and the SCL instruction is 0. The second operand of the SCL instruction is set to 0 to indicate the mode of the destination register of the load instruction should be set to EMPTY state.

When the loop accelerator 130 executes the hoisted load instruction, it performs the load and causes an entry for the load instruction to be inserted in the ordering buffer 150. In one embodiment, the entry for the load instruction includes the RPO of the load instruction (which is 4 in this case) and the result of the load. If misspeculation occurs (e.g., control flow enters branch L1 instead of branch L0), then the loop accelerator 130 executes the SCL instruction. When the loop accelerator 130 executes the SCL instruction, it determines the RPO of the load instruction (e.g., using the first operand provided by the SCL instruction), scans the ordering buffer 150 to locate the entry for the load instruction (using the RPO of the load instruction), and discards the entry for the load instruction from the ordering buffer 150. In this way, when a misspeculation occurs, the SCL instruction ensures that the results of the load are canceled.

Figure 5:
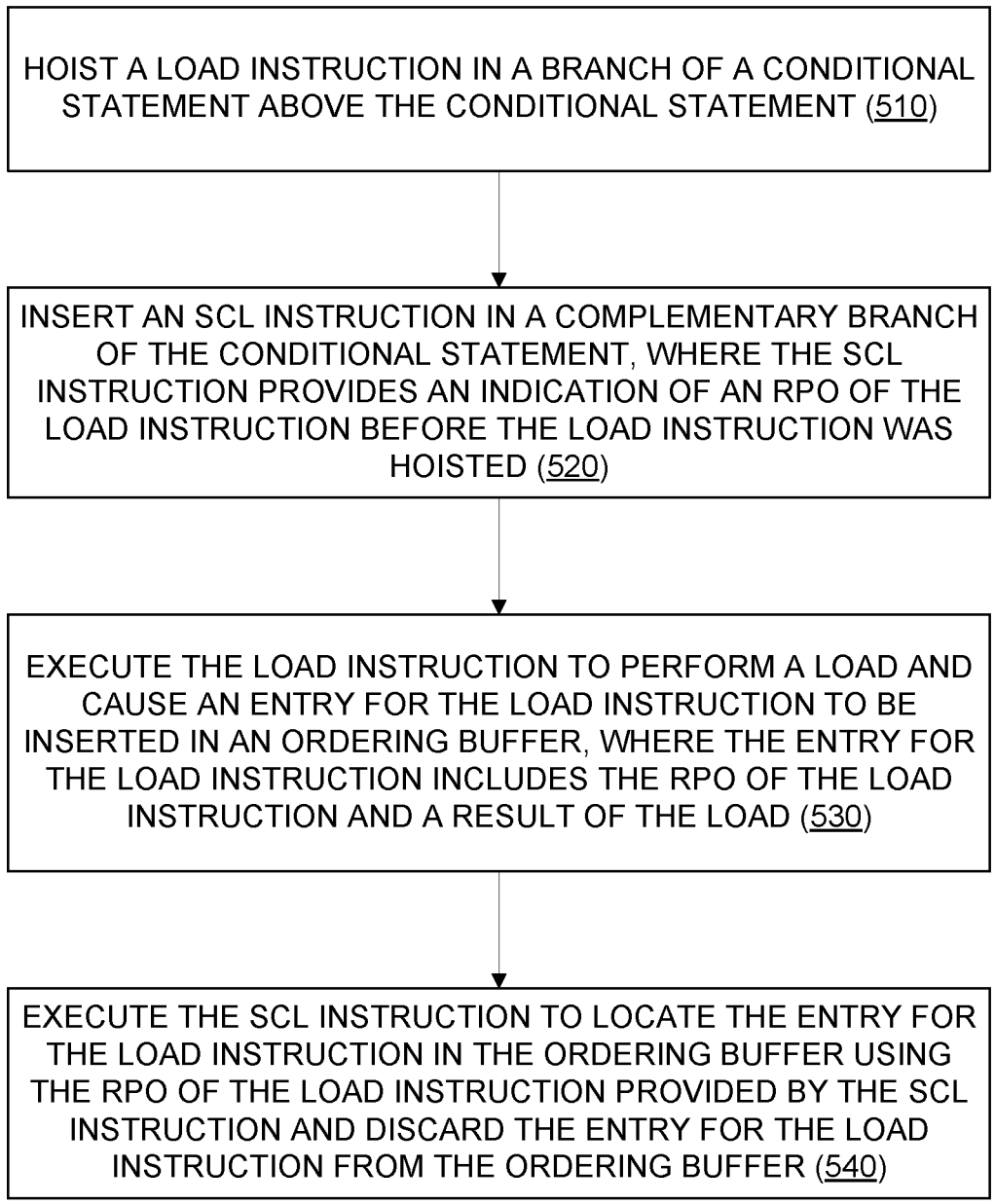
FIG. 5 is a flow diagram of a process to implement control speculation that enables high levels of inter-iteration parallelism in a highly parallel strand-based architecture, according to some embodiments.

FIG. 5 is a flow diagram of a process to implement control speculation that enables high levels of inter-iteration parallelism in a highly parallel strand-based architecture, according to some embodiments. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

At block 510, the binary translator 110 hoists a load instruction in a branch of a conditional statement above the conditional statement. At block 520, the binary translator 110 then inserts an SCL instruction in a complementary branch of the conditional statement (e.g., a branch of the conditional statement that is different from the branch that included the load instruction before the load instruction was hoisted), where the SCL instruction provides an indication of an RPO of the load instruction before the load instruction was hoisted. In one embodiment, the indication of the RPO of the load instruction is a delta value that indicates a difference between an RPO of the SCL instruction and the RPO of the load instruction. In one embodiment, the SCL instruction further provides an indication of a mode for a destination register of the load instruction. At block 530, a loop accelerator 130 (and more specifically, an execution circuit 135 of a loop accelerator 130) executes the load instruction to perform a load and cause an entry for the load instruction to be inserted in an ordering buffer 150, where the entry for the load instruction in the ordering buffer 150 includes the RPO of the load instruction and a result of the load. At block 540, the loop accelerator 130 executes the SCL instruction to locate the entry for the load instruction in the ordering buffer 150 using the RPO of the load instruction provided by the SCL instruction and discard the entry for the load instruction from the ordering buffer 150. In one embodiment, the loop accelerator 130 determines whether the entry for the load instruction is in the ordering buffer 150 based on determining whether the ordering buffer 150 includes an entry having an RPO that matches the RPO of the load instruction provided by the SCL instruction. In an embodiment where the indication of the RPO of the load instruction (provided by the SCL instruction) is a delta value, the loop accelerator 130 determines the RPO of the load instruction based on adding the delta value to the RPO of the SCL instruction. In one embodiment, the loop accelerator 130 determines the RPO of the SCL instruction during a decode stage of the SCL instruction. In one embodiment, the loop accelerator 130 processes entries in the ordering buffer 150 in RPO order for load instruction retirement. In an embodiment where the SCL instruction provides an indication of a mode for a destination register of the load instruction, the loop accelerator 130 sets the mode of the destination register to an EMPTY state or FULL state depending on the indication of the mode provided by the SCL instruction.

An advantage of embodiments disclosed herein is that they do not introduce extra instructions into the control flow path when speculation is confirmed (this is in contrast to techniques that insert a chk.s instruction or similar instruction, which potentially penalizes the critical path). Another advantage of embodiments disclosed herein is that the SCL instruction guarantees that the results of a hoisted load are canceled if misspeculation occurs, which allows safe execution of parallel iterations. Other advantages will be apparent to one having ordinary skill in the art from the disclosure provided herein.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
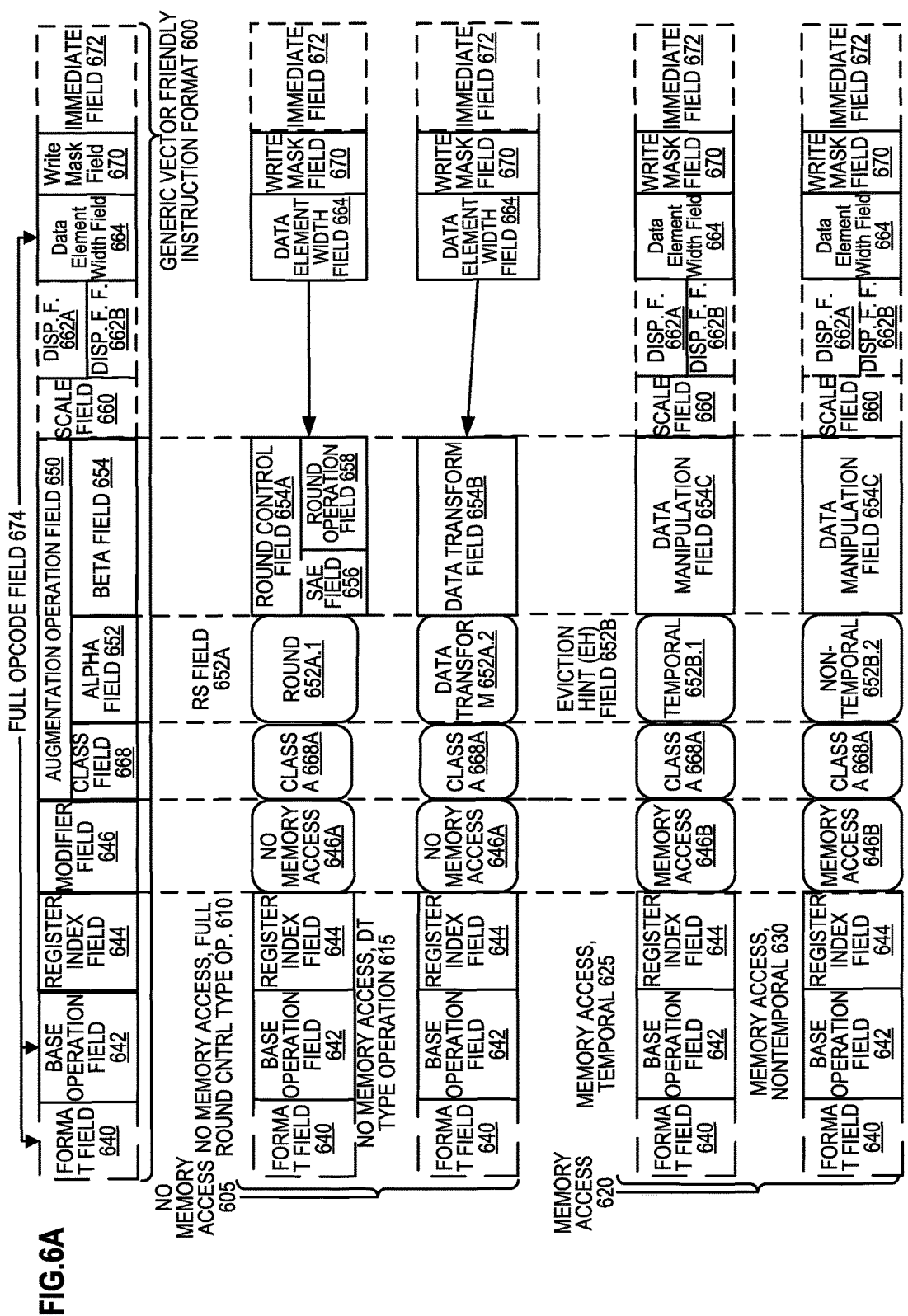
FIGS. 6A-6B are block diagrams illustrating a generic vector friendly instruction format and instruction templates thereof according to embodiments of the invention.
Figure 6B:
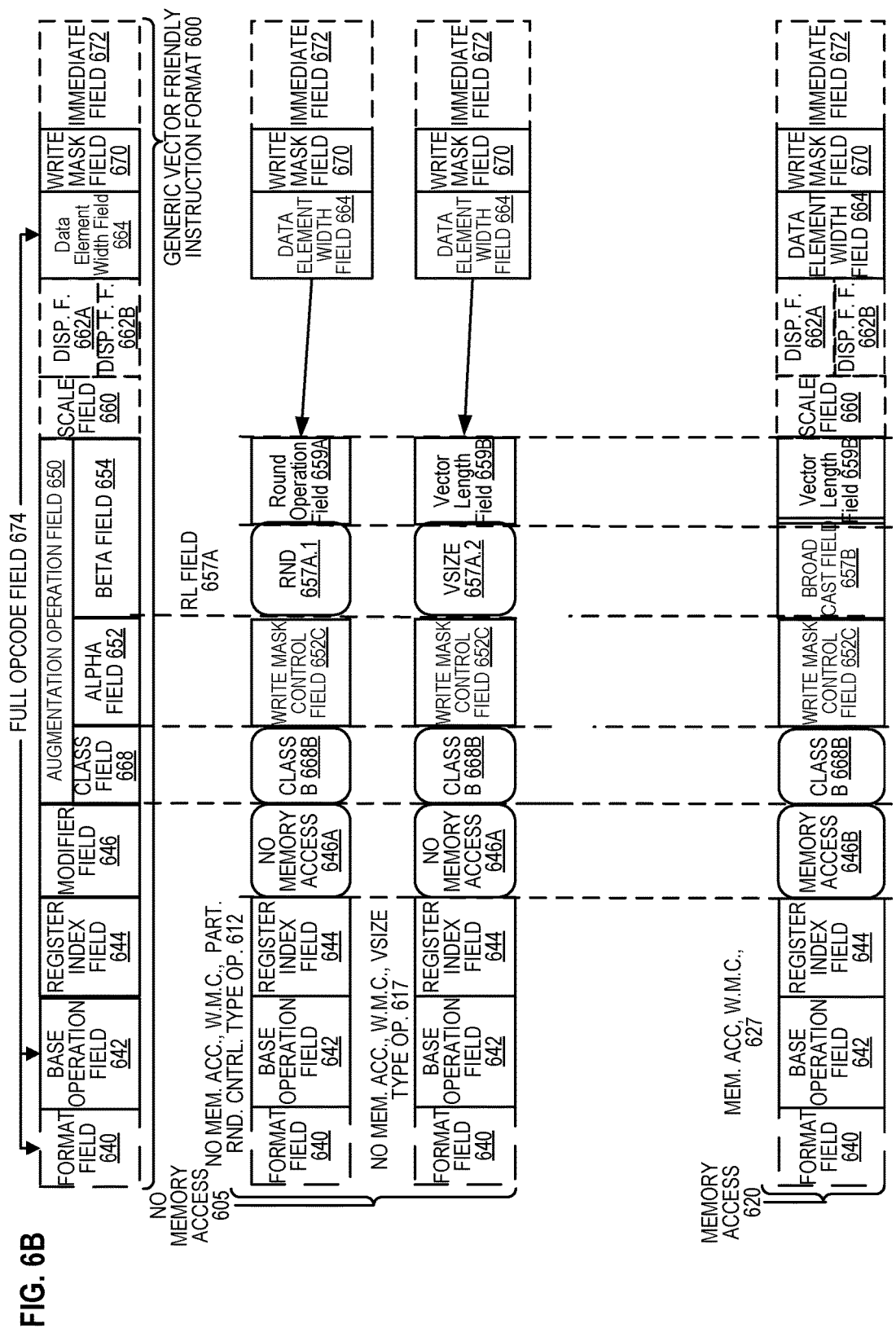

FIGS. 6A-6B are block diagrams illustrating a generic vector friendly instruction format and instruction templates thereof according to embodiments of the invention. FIG. 6A is a block diagram illustrating a generic vector friendly instruction format and class A instruction templates thereof according to embodiments of the invention; while FIG. 6B is a block diagram illustrating the generic vector friendly instruction format and class B instruction templates thereof according to embodiments of the invention. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the invention, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}$*index+base).

Displacement Field 662A—its content is used as part of memory address generation (e.g., for address generation that uses $2^{scale}$*index+base+displacement).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the invention are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that is it not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the invention the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the invention where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the invention where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7A is a block diagram illustrating an exemplary specific vector friendly instruction format according to embodiments of the invention. FIG. 7A shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7A map are illustrated.

It should be understood that, although embodiments of the invention are described with reference to the specific vector friendly instruction format 700 in the context of the generic vector friendly instruction format 600 for illustrative purposes, the invention is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the invention is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0×62 (the unique value used for distinguishing the vector friendly instruction format in one embodiment of the invention).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]-R), EVEX.X bit field (EVEX byte 1, bit [6]-X), and 657BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]-mmmm)—its content encodes an implied leading opcode byte (0F, 0F 38, or 0F 3).

Data element width field 664 (EVEX byte 2, bit [7]-W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.U 668 Class field (EVEX byte 2, bit [2]-U)—If EVEX.U=0, it indicates class A or EVEX.U0; if EVEX.U=1, it indicates class B or EVEX.U1.

Prefix encoding field 725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the invention. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the invention. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

Figure 7D:
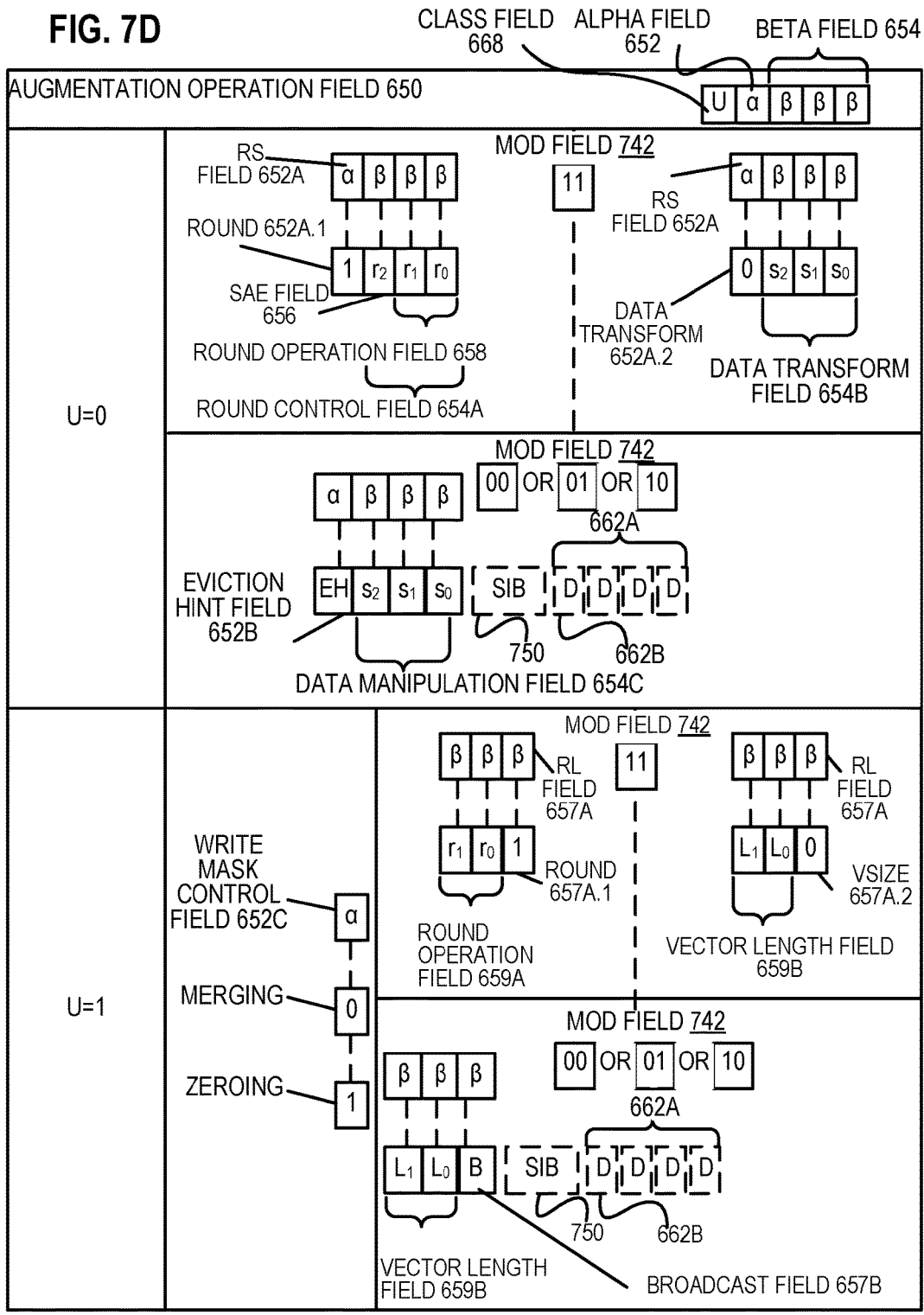
FIG. 7D is a block diagram illustrating the fields of the specific vector friendly instruction format 700 that make up the augmentation operation field 650 according to one embodiment of the invention.

FIG. 7D is a block diagram illustrating the fields of the specific vector friendly instruction format 700 that make up the augmentation operation field 650 according to one embodiment of the invention. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]-EH) is interpreted as the rs field 652A. When the rs field 652A contains a 1 (round 652A.1), the beta field 654 (EVEX byte 3, bits [6:4]-SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]-SSS) is interpreted as a three bit data transform field 654B. When U=0 and the MOD field 742 contains 00, 01, or 10 (signifying a memory access operation), the alpha field 652 (EVEX byte 3, bit [7]-EH) is interpreted as the eviction hint (EH) field 652B and the beta field 654 (EVEX byte 3, bits [6:4]-SSS) is interpreted as a three bit data manipulation field 654C.

When U=1, the alpha field 652 (EVEX byte 3, bit [7]-EH) is interpreted as the write mask control (Z) field 652C. When U=1 and the MOD field 742 contains 11 (signifying a no memory access operation), part of the beta field 654 (EVEX byte 3, bit [4]-$S_0$) is interpreted as the RL field 657A; when it contains a 1 (round 657A.1) the rest of the beta field 654 (EVEX byte 3, bit [6-5]-$S_{2-1}$) is interpreted as the round operation field 659A, while when the RL field 657A contains a 0 (VSIZE 657.A2) the rest of the beta field 654 (EVEX byte 3, bit [6-5]-$S_{2-1}$) is interpreted as the vector length field 659B (EVEX byte 3, bit [6-5]-$L_{1-0}$). When U=1 and the MOD field 742 contains 00, 01, or 10 (signifying a memory access operation), the beta field 654 (EVEX byte 3, bits [6:4]-SSS) is interpreted as the vector length field 659B (EVEX byte 3, bit [6-5]-$L_{1-0}$) and the broadcast field 657B (EVEX byte 3, bit [4]-B).

Exemplary Register Architecture

Figure 8:
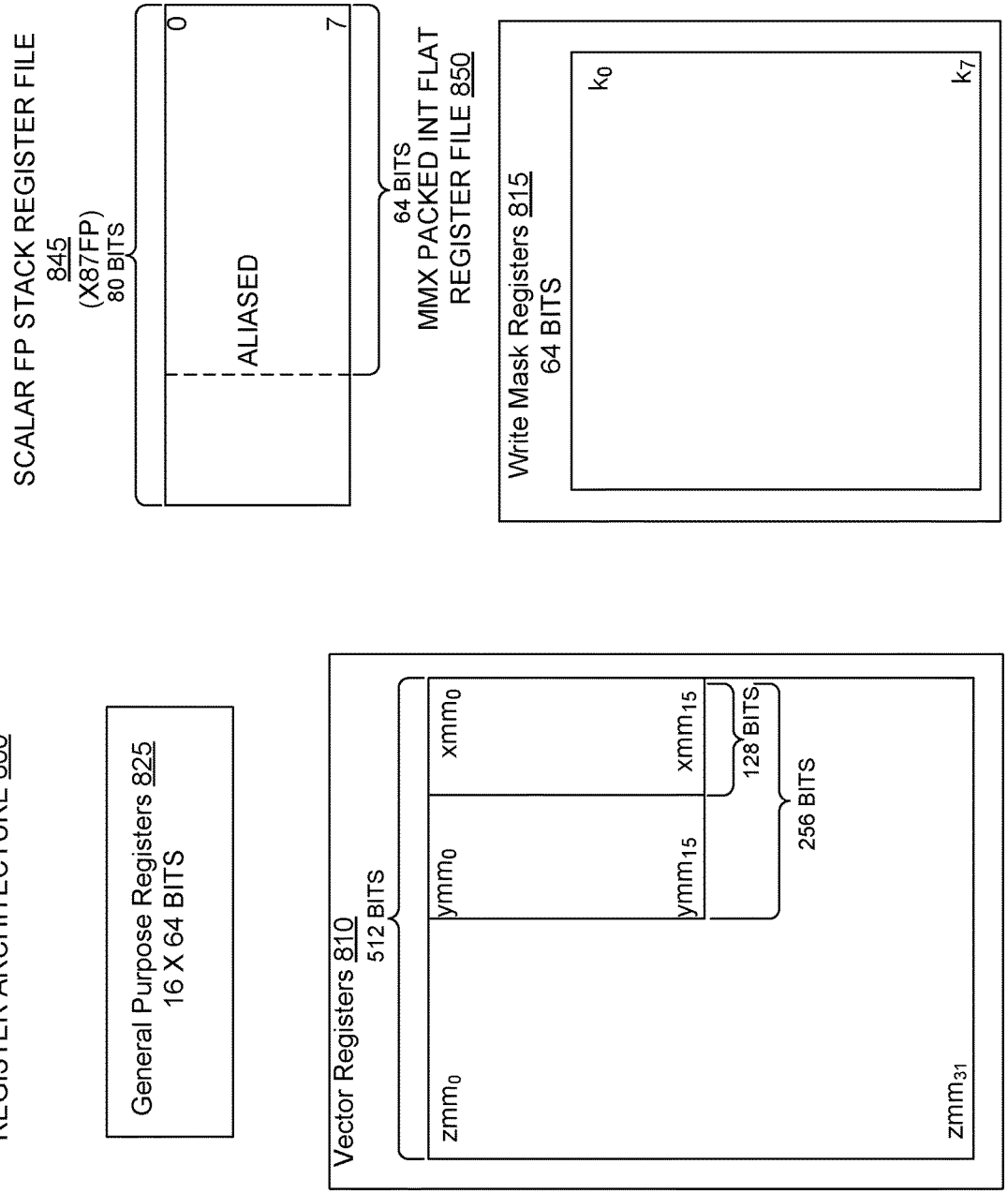
FIG. 8 is a block diagram of a register architecture 800 according to one embodiment of the invention.

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) B (FIG. 6B; U = 1) | 610, 615, 625, 630 612 | zmm registers (the vector length is 64 byte) zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
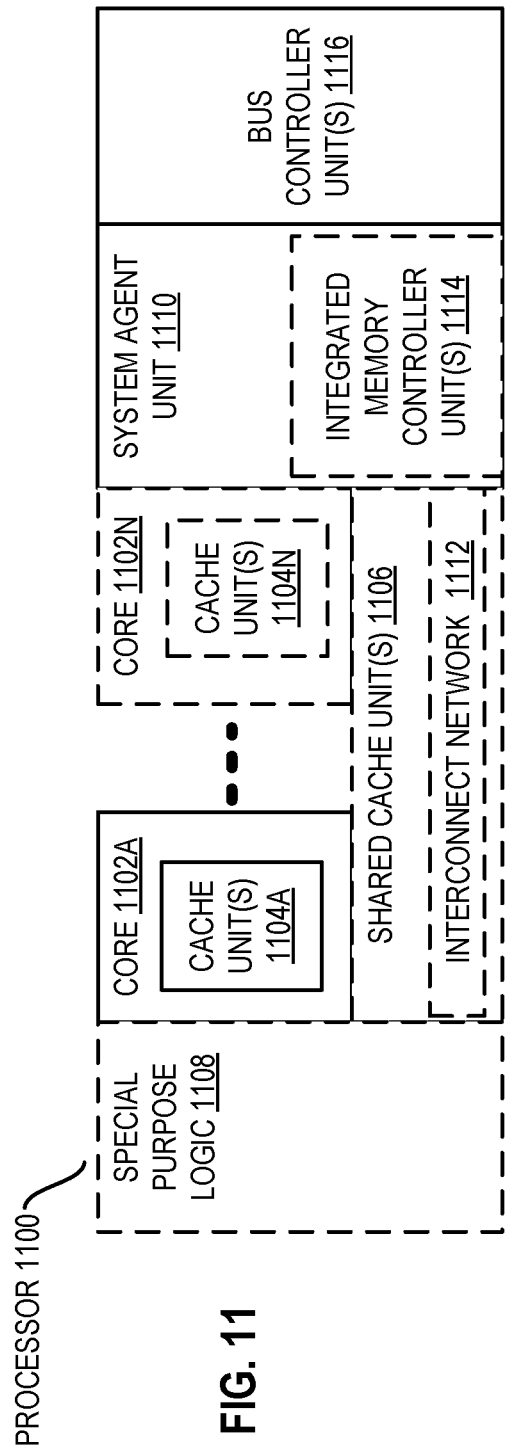
FIG. 11 is a block diagram of a processor 1100 that may have more than one core, may have an integrated memory controller, and may have integrated graphics according to embodiments of the invention.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108 (integrated graphics logic 1108 is an example of and is also referred to herein as special purpose logic), the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
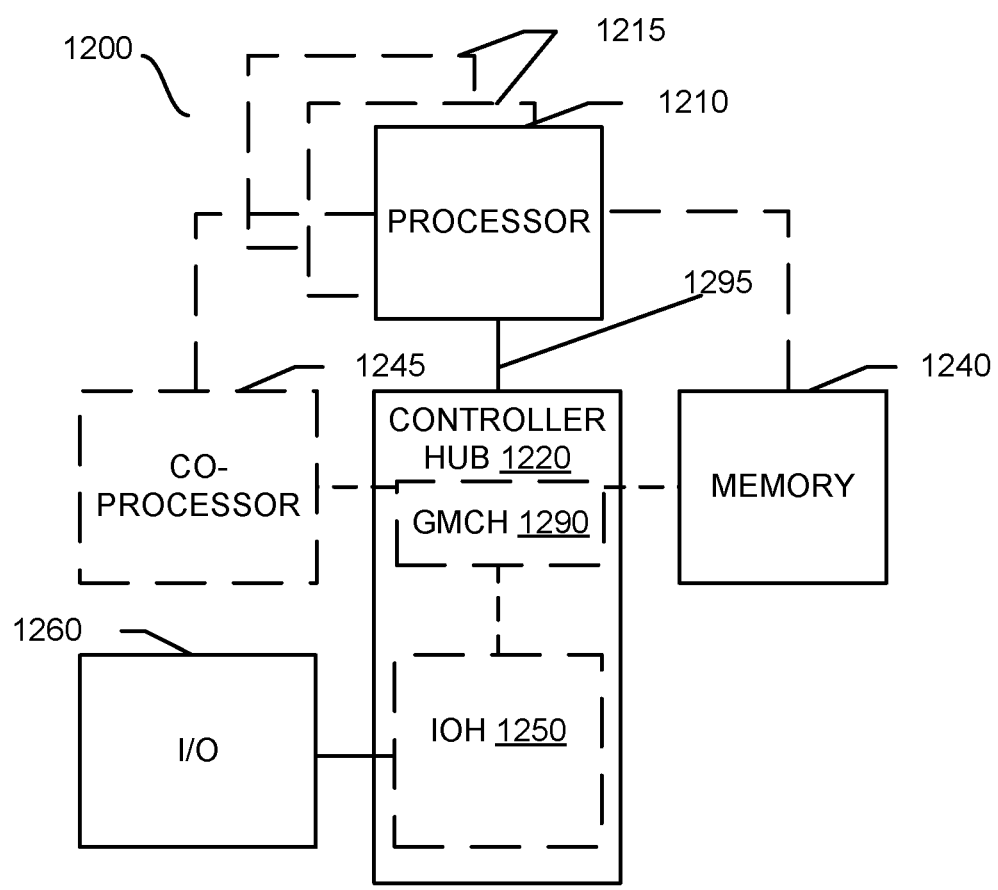
FIGS. 12-15 are block diagrams of exemplary computer architectures.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
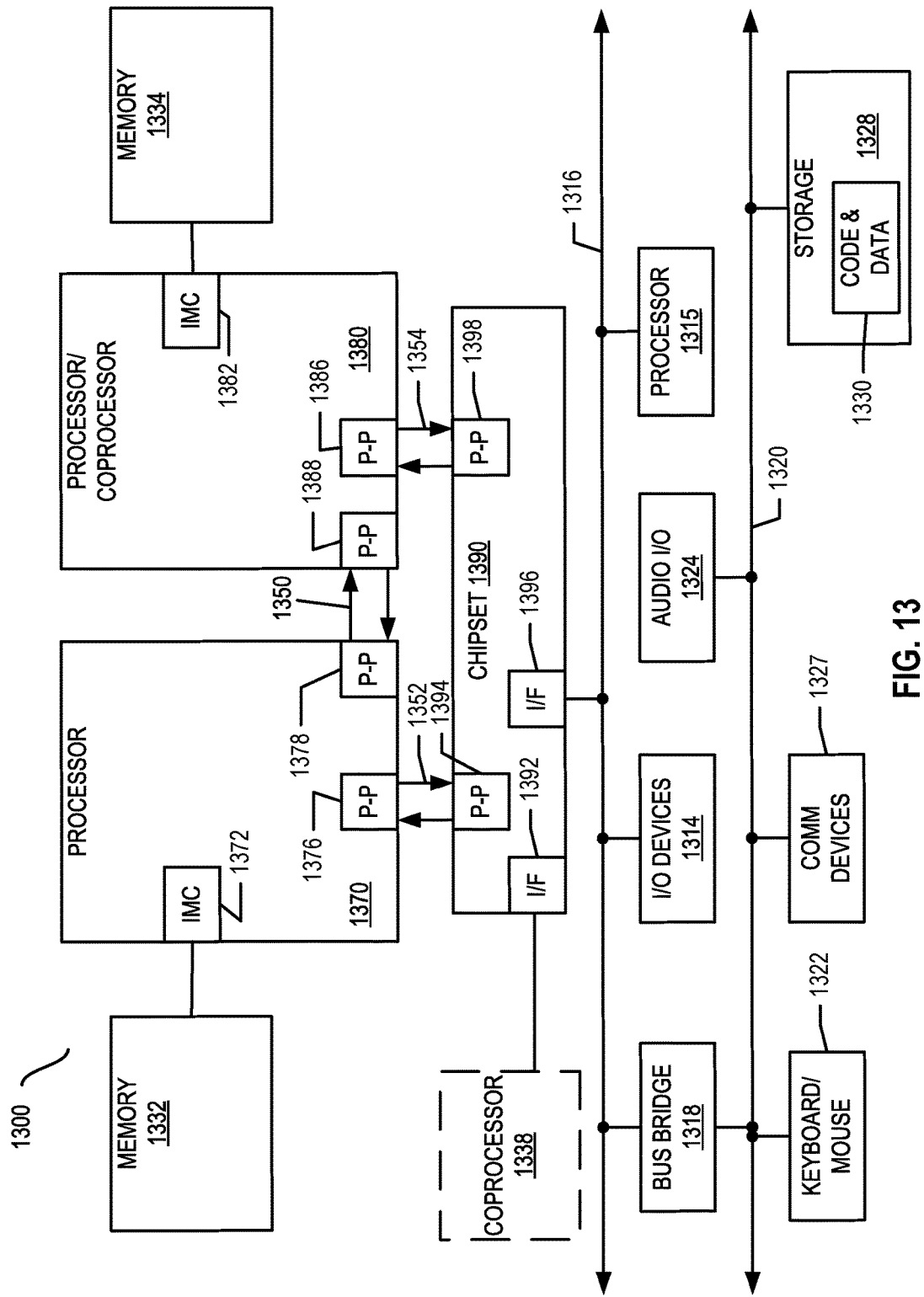

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
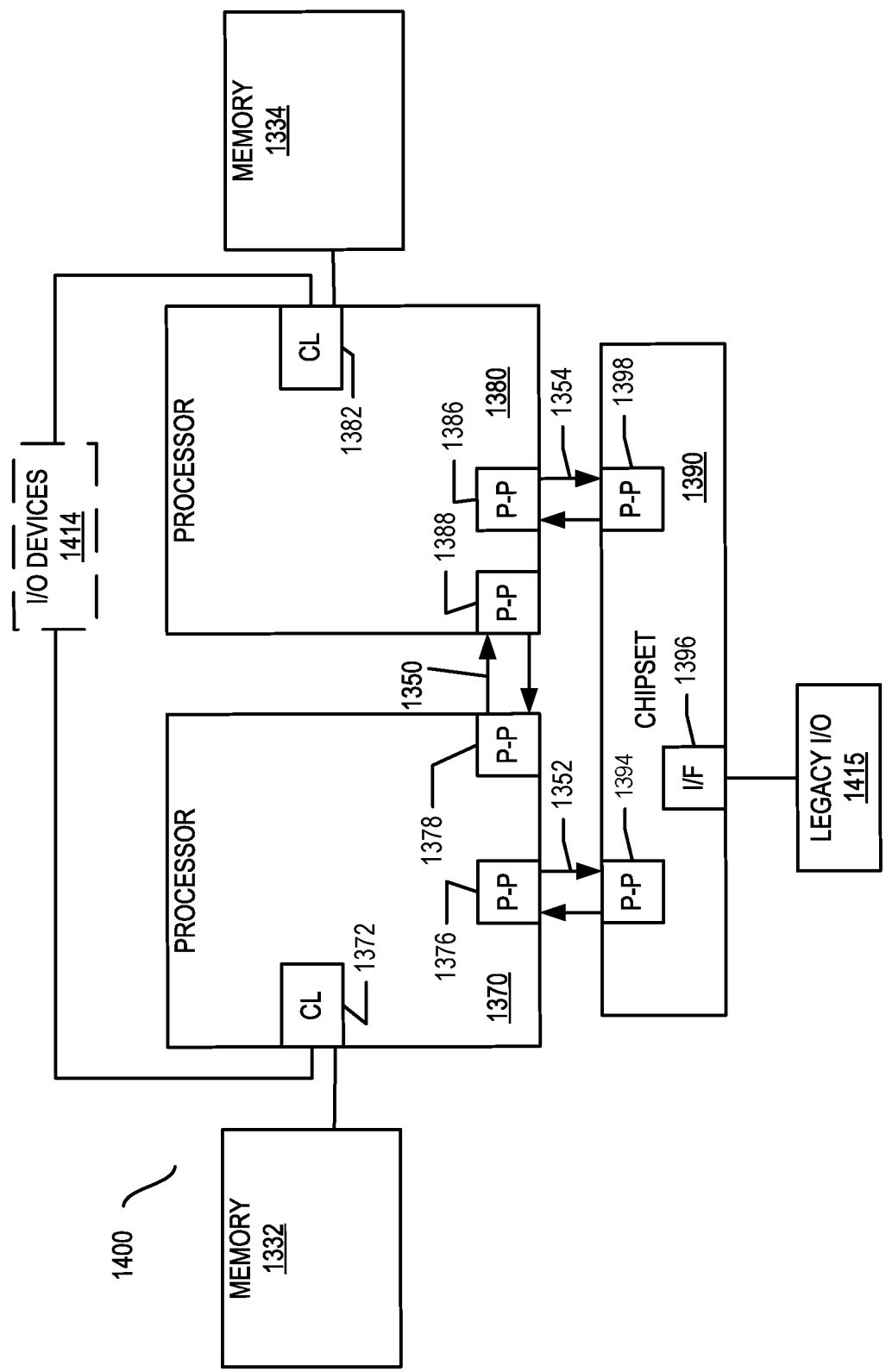

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
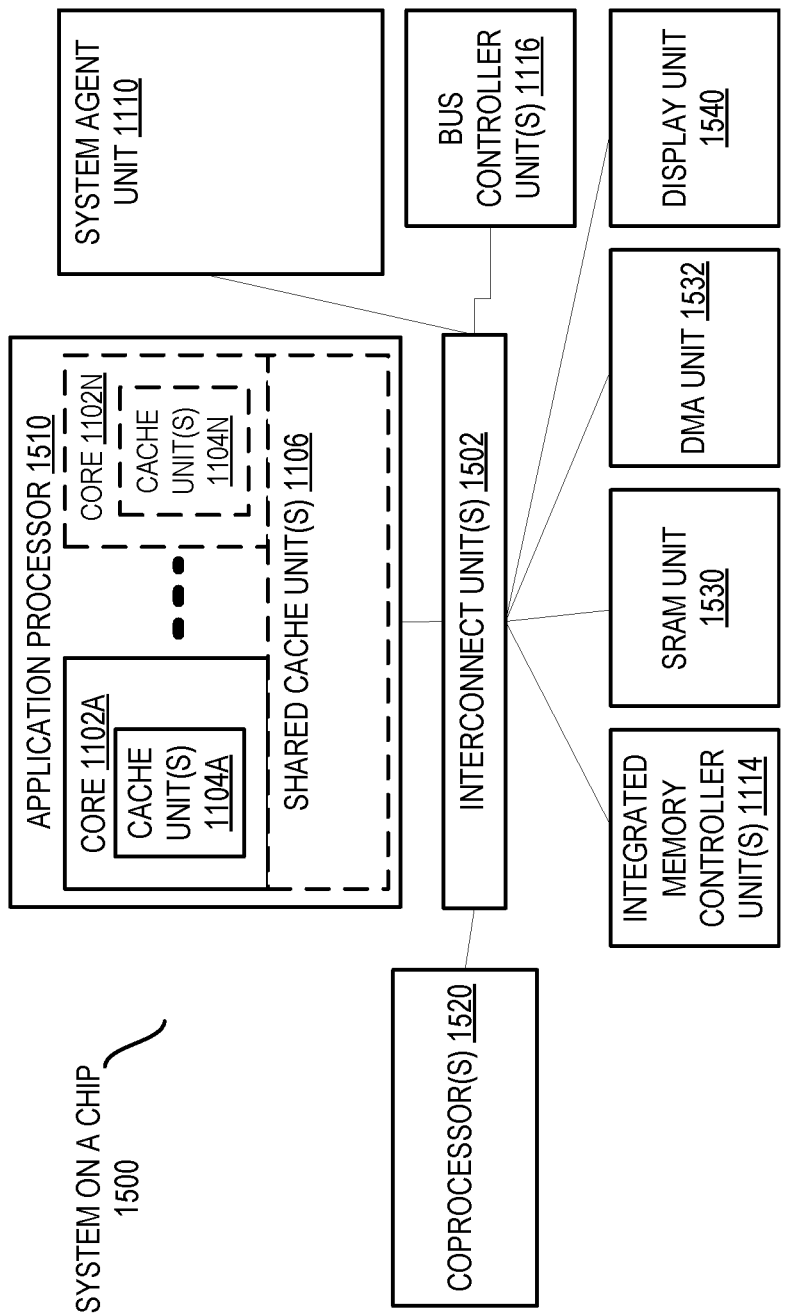

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 1102A-N, which include cache units 1104A-N, and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

EXAMPLES

Example 1 is an apparatus. The apparatus includes a binary translator to hoist a load instruction in a branch of a conditional statement above the conditional statement and insert an SCL instruction in a complementary branch of the conditional statement, where the SCL instruction provides an indication of an RPO of the load instruction before the load instruction was hoisted. The apparatus further includes an ordering buffer. The apparatus further includes an execution circuit to execute the load instruction to perform a load and cause an entry for the load instruction to be inserted in the ordering buffer, where the entry for the load instruction includes the RPO of the load instruction and a result of the load, and where the execution circuit to execute the SCL instruction to locate the entry for the load instruction in the ordering buffer using the RPO of the load instruction provided by the SCL instruction and discard the entry for the load instruction from the ordering buffer.

Example 2 includes the substance of example 1. In this example, the execution circuit is to determine whether the entry for the load instruction is in the ordering buffer based on determining whether the ordering buffer includes an entry having an RPO that matches the RPO of the load instruction provided by the SCL instruction.

Example 3 includes the substance of example 1. In this example, the indication of the RPO of the load instruction provided by the SCL instruction is a delta value that indicates a difference between an RPO of the SCL instruction and the RPO of the load instruction.

Example 4 includes the substance of example 3. In this example, the execution circuit is to determine the RPO of the load instruction based on adding the delta value to the RPO of the SCL instruction.

Example 5 includes the substance of claim 4. In this example, the execution circuit is to determine the RPO of the SCL instruction during a decode stage of the SCL instruction.

Example 6 includes the substance of claim 1. In this example, the execution circuit is to process entries in the ordering buffer in RPO order for load instruction retirement.

Example 7 includes the substance of claim 1. In this example, the SCL instruction further provides an indication of a mode for a destination register of the load instruction, where the execution circuit is to set the destination register to an empty state or a full state depending on the indication of the mode provided by the SCL instruction.

Example 8 is a method. The method includes hoisting a load instruction in a branch of a conditional statement above the conditional statement, inserting an SCL instruction in a complementary branch of the conditional statement, where the SCL instruction provides an indication of an RPO of the load instruction before the load instruction was hoisted, executing the load instruction to perform a load and cause an entry for the load instruction to be inserted in an ordering buffer, where the entry for the load instruction includes the RPO of the load instruction and a result of the load, and executing the SCL instruction to locate the entry for the load instruction in the ordering buffer using the RPO of the load instruction provided by the SCL instruction and discard the entry for the load instruction from the ordering buffer.

Example 9 includes the substance of claim 8. In this example, the method further includes determining whether the entry for the load instruction is in the ordering buffer based on determining whether the ordering buffer includes an entry having an RPO that matches the RPO of the load instruction provided by the SCL instruction.

Example 10 includes the substance of claim 8. In this example, the indication of the RPO of the load instruction provided by the SCL instruction is a delta value that indicates a difference between an RPO of the SCL instruction and the RPO of the load instruction.

Example 11 includes the substance of claim 10. In this example, the method further includes determining the RPO of the load instruction based on adding the delta value to the RPO of the SCL instruction.

Example 12 includes the substance of claim 11. In this example, the method further includes determining the RPO of the SCL instruction during a decode stage of the SCL instruction.

Example 13 includes the substance of claim 8. In this example, the method further includes processing entries in the ordering buffer in RPO order for load instruction retirement.

Example 14 includes the substance of claim 8. In this example, the SCL instruction further provides an indication of a mode for a destination register of the load instruction, where the mode is any one of an empty state or a full state.

Example 15 is a system. The system includes a binary translator to hoist a load instruction in a branch of a conditional statement above the conditional statement and insert an SCL instruction in a complementary branch of the conditional statement, where the SCL instruction provides an indication of an RPO of the load instruction before the load instruction was hoisted. The system further includes an ordering buffer. The system further includes a loop accelerator that includes a plurality of execution circuits, where an execution circuit from the plurality of execution circuits is to execute the load instruction to perform a load and cause an entry for the load instruction to be inserted in the ordering buffer, where the entry for the load instruction includes the RPO of the load instruction and a result of the load, and where the execution circuit is to execute the SCL instruction to locate the entry for the load instruction in the ordering buffer using the RPO of the load instruction provided by the SCL instruction and discard the entry for the load instruction from the ordering buffer.

Example 16 includes the substance of example 15. In this example, the execution circuit is to determine whether the entry for the load instruction is in the ordering buffer based on determining whether the ordering buffer includes an entry having an RPO that matches the RPO of the load instruction provided by the SCL instruction.

Example 17 includes the substance of example 15. In this example, the indication of the RPO of the load instruction provided by the SCL instruction is a delta value that indicates a difference between an RPO of the SCL instruction and the RPO of the load instruction.

Example 18 includes the substance of example 17. In this example, the execution circuit is to determine the RPO of the load instruction based on adding the delta value to the RPO of the SCL instruction.

Example 19 includes the substance of example 18. In this example, the execution circuit is to determine the RPO of the SCL instruction during a decode stage of the SCL instruction.

Example 20 includes the substance of example 15. In this example, the execution circuit is to process entries in the ordering buffer in RPO order for load instruction retirement.

Example 21 includes the substance of example 15. In this example, the SCL instruction further provides an indication of a mode for a destination register of the load instruction, where the execution circuit is to set the destination register to an empty state or a full state depending on the indication of the mode provided by the SCL instruction.

Example 22 is an apparatus. The apparatus includes a binary translation means to hoist a load instruction in a branch of a conditional statement above the conditional statement and insert an SCL instruction in a complementary branch of the conditional statement, where the SCL instruction provides an indication of an RPO of the load instruction before the load instruction was hoisted. The apparatus further includes an ordering buffer. The apparatus further includes an executing means to execute the load instruction to perform a load and cause an entry for the load instruction to be inserted in the ordering buffer, where the entry for the load instruction includes the RPO of the load instruction and a result of the load, and where the executing means is to execute the SCL instruction to locate the entry for the load instruction in the ordering buffer using the RPO of the load instruction provided by the SCL instruction and discard the entry for the load instruction from the ordering buffer.

Example 23 includes the substance of example 22. In this example, the executing means is to determine whether the entry for the load instruction is in the ordering buffer based on determining whether the ordering buffer includes an entry having an RPO that matches the RPO of the load instruction provided by the SCL instruction.

Example 24 includes the substance of example 22. In this example, the indication of the RPO of the load instruction provided by the SCL instruction is a delta value that indicates a difference between an RPO of the SCL instruction and the RPO of the load instruction.

Example 25 includes the substance of example 24. In this example, the executing means is to determine the RPO of the load instruction based on adding the delta value to the RPO of the SCL instruction.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus comprising:
 a binary translator to hoist, in an execution sequence, a load instruction in a branch of a conditional statement above the conditional statement and insert a speculation control of load (SCL) instruction in a complementary branch of the conditional statement, wherein the SCL instruction provides an indication of a real program order (RPO) of the load instruction before the load instruction was hoisted;
 an ordering buffer; and
 an execution circuit to execute the load instruction to perform a load and cause an entry for the load instruction to be inserted in the ordering buffer, wherein the entry for the load instruction includes the RPO of the load instruction and a result of the load, and wherein the execution circuit is to execute the SCL instruction to locate the entry for the load instruction in the ordering buffer using the RPO of the load instruction provided by the SCL instruction and discard the entry for the load instruction from the ordering buffer.

2. The apparatus of claim 1, wherein the execution circuit is to determine whether the entry for the load instruction is in the ordering buffer based on determining whether the ordering buffer includes an entry having an RPO that matches the RPO of the load instruction provided by the SCL instruction.

3. The apparatus of claim 1, wherein the indication of the RPO of the load instruction provided by the SCL instruction is a delta value that indicates a difference between an RPO of the SCL instruction and the RPO of the load instruction.

4. The apparatus of claim 3, wherein the execution circuit is to determine the RPO of the load instruction based on adding the delta value to the RPO of the SCL instruction.

5. The apparatus of claim 4, wherein the execution circuit is to determine the RPO of the SCL instruction during a decode stage of the SCL instruction.

6. The apparatus of claim 1, wherein the execution circuit is to process entries in the ordering buffer in RPO order for load instruction retirement.

7. The apparatus of claim 1, wherein the SCL instruction further provides an indication of a mode for a destination register of the load instruction, wherein the execution circuit is to set the destination register to an empty state or a full state depending on the indication of the mode provided by the SCL instruction.

8. A method comprising:
hoisting, in an execution sequence, a load instruction in a branch of a conditional statement above the conditional statement;
inserting a speculation control of load (SCL) instruction in a complementary branch of the conditional statement, wherein the SCL instruction provides an indication of a real program order (RPO) of the load instruction before the load instruction was hoisted;
executing the load instruction to perform a load and cause an entry for the load instruction to be inserted in an ordering buffer, wherein the entry for the load instruction includes the RPO of the load instruction and a result of the load; and
executing the SCL instruction to locate the entry for the load instruction in the ordering buffer using the RPO of the load instruction provided by the SCL instruction and discard the entry for the load instruction from the ordering buffer.

9. The method of claim 8, further comprising:
determining whether the entry for the load instruction is in the ordering buffer based on determining whether the ordering buffer includes an entry having an RPO that matches the RPO of the load instruction provided by the SCL instruction.

10. The method of claim 8, wherein the indication of the RPO of the load instruction provided by the SCL instruction is a delta value that indicates a difference between an RPO of the SCL instruction and the RPO of the load instruction.

11. The method of claim 10, further comprising:
determining the RPO of the load instruction based on adding the delta value to the RPO of the SCL instruction.

12. The method of claim 11, further comprising:
determining the RPO of the SCL instruction during a decode stage of the SCL instruction.

13. The method of claim 8, further comprising:
processing entries in the ordering buffer in RPO order for load instruction retirement.

14. The method of claim 8, wherein the SCL instruction further provides an indication of a mode for a destination register of the load instruction, wherein the mode is any one of an empty state or a full state.

15. A system comprising:
a binary translator to hoist, in an execution sequence, a load instruction in a branch of a conditional statement above the conditional statement and insert a speculation control of load (SCL) instruction in a complementary branch of the conditional statement, wherein the SCL instruction provides an indication of a real program order (RPO) of the load instruction before the load instruction was hoisted;
an ordering buffer; and
a loop accelerator that includes a plurality of execution circuits, wherein an execution circuit from the plurality of execution circuits is to execute the load instruction to perform a load and cause an entry for the load instruction to be inserted in the ordering buffer, wherein the entry for the load instruction includes the RPO of the load instruction and a result of the load, and wherein the execution circuit is to execute the SCL instruction to locate the entry for the load instruction in the ordering buffer using the RPO of the load instruction provided by the SCL instruction and discard the entry for the load instruction from the ordering buffer.

16. The system of claim 15, wherein the execution circuit is to determine whether the entry for the load instruction is in the ordering buffer based on determining whether the ordering buffer includes an entry having an RPO that matches the RPO of the load instruction provided by the SCL instruction.

17. The system of claim 15, wherein the indication of the RPO of the load instruction provided by the SCL instruction is a delta value that indicates a difference between an RPO of the SCL instruction and the RPO of the load instruction.

18. The system of claim 17, wherein the execution circuit is to determine the RPO of the load instruction based on adding the delta value to the RPO of the SCL instruction.

19. The system of claim 18, wherein the execution circuit is to determine the RPO of the SCL instruction during a decode stage of the SCL instruction.

20. The system of claim 15, wherein the execution circuit is to process entries in the ordering buffer in RPO order for load instruction retirement.

* * * * *